(12) United States Patent
Kim et al.

(10) Patent No.: US 11,889,006 B2
(45) Date of Patent: Jan. 30, 2024

(54) ELECTRONIC DEVICE INCLUDING FLEXIBLE DISPLAY

(71) Applicant: SAMSUNG ELECTRONICS CO., LTD., Suwon-si (KR)

(72) Inventors: Jongyoon Kim, Suwon-si (KR); Jongkeun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 17/424,270

(22) PCT Filed: Jul. 8, 2021

(86) PCT No.: PCT/KR2021/008692
§ 371 (c)(1),
(2) Date: Jul. 20, 2021

(87) PCT Pub. No.: WO2022/045572
PCT Pub. Date: Mar. 3, 2022

(65) Prior Publication Data
US 2022/0311843 A1    Sep. 29, 2022

(30) Foreign Application Priority Data
Aug. 28, 2020  (KR) .................. 10-2020-0109265

(51) Int. Cl.
*H04M 1/02* (2006.01)
*G06F 1/16* (2006.01)

(52) U.S. Cl.
CPC ........ *H04M 1/0216* (2013.01); *G06F 1/1652* (2013.01); *G06F 1/1681* (2013.01); *H04M 1/0268* (2013.01); *H04M 2201/38* (2013.01)

(58) Field of Classification Search
CPC .... G06F 1/1652; G06F 1/1681; G06F 1/1616; G06F 1/1647; G09F 9/301; F16C 11/04;
(Continued)

(56) References Cited

U.S. PATENT DOCUMENTS 5,048,715 A * 9/1991 Wolff ................... B65D 43/168
                                                             220/840
9,009,919 B1 * 4/2015 Chiang ................. G06F 1/1681
                                                              16/303
(Continued)

FOREIGN PATENT DOCUMENTS

CN      208982476       6/2019
CN      110442196      11/2019
(Continued)

OTHER PUBLICATIONS

Search Report and Written Opinion dated Oct. 26, 2021 in PCT/KR2021/008692.
(Continued)

*Primary Examiner* — Andrew Wendell
(74) *Attorney, Agent, or Firm* — Nixon & Vanderhye, P.C.

(57) ABSTRACT

According to an embodiment, an electronic device comprises: a first housing, a second housing, a hinge module pivotably connecting the first housing and the second housing, and a flexible display disposed from a surface of the first housing through an area where the hinge module is disposed to a surface of the second housing. The hinge module may include: a detent hinge at least partially receiving a pair of rotation shafts and including a cam-shaped cam surface formed in a direction perpendicular to a rotation axis of the rotation shaft, a roller contacting the cam surface and disposed to rotate corresponding to the cam shape, at least one elastic member including an elastic material formed to provide an elastic force disposed in the direction perpendicular to the rotation axis of the rotation shaft and configured to deliver an elastic force to the roller, and a detent bracket including the pair of shafts and defining a space for receiving the roller and the at least one elastic member.

15 Claims, 23 Drawing Sheets

(58) Field of Classification Search
CPC .......... H04B 1/03; H04B 1/08; H04B 1/3827; H04M 1/0216; H04M 1/0268; H04M 2201/38; H04M 1/022; H04M 1/021; H04M 1/0214; H04M 1/0233; H04M 1/0269

See application file for complete search history.

(56) References Cited

U.S. PATENT DOCUMENTS

| | | | |
|---|---|---|---|
| 9,983,627 B1* | 5/2018 | Pelissier | G06F 1/1681 |
| 10,564,682 B1* | 2/2020 | Wu | H05K 5/0226 |
| 2002/0073508 A1* | 6/2002 | Rude | G06F 1/1616 |
| | | | 16/341 |
| 2005/0138772 A1* | 6/2005 | Park | H04M 1/0216 |
| | | | 16/330 |
| 2012/0194972 A1* | 8/2012 | Bohn | G06F 1/1681 |
| | | | 361/679.01 |
| 2013/0010405 A1* | 1/2013 | Rothkopf | H05K 5/0226 |
| | | | 361/679.01 |
| 2013/0016492 A1 | 1/2013 | Wang et al. | |
| 2016/0323430 A1* | 11/2016 | Fiori | H04M 1/0214 |
| 2018/0209473 A1* | 7/2018 | Park | H04M 1/022 |
| 2018/0329460 A1* | 11/2018 | Song | G06F 1/1626 |
| 2019/0324501 A1* | 10/2019 | Kim | H05K 5/0017 |
| 2020/0103935 A1 | 4/2020 | Hsu | |
| 2020/0267244 A1 | 8/2020 | Kim et al. | |
| 2020/0352044 A1* | 11/2020 | Hsu | H05K 5/0247 |
| 2021/0373609 A1 | 12/2021 | Kim et al. | |
| 2022/0261040 A1 | 8/2022 | Liu et al. | |

FOREIGN PATENT DOCUMENTS

| | | |
|---|---|---|
| CN | 211123830 | 7/2020 |
| EP | 1666743 | 6/2006 |
| KR | 10-2018-0094172 | 8/2018 |
| KR | 10-2019-0007788 | 1/2019 |
| KR | 10-2020-0101251 | 8/2020 |
| WO | 2019/211435 | 11/2019 |

OTHER PUBLICATIONS

Extended European Search Report dated Oct. 31, 2023 issued in European Patent Application No. 21861873.4.

* cited by examiner

ELECTRONIC DEVICE INCLUDING FLEXIBLE DISPLAY

CROSS-REFERENCE TO RELATED APPLICATION

This application is a national stage of International Application No. PCT/KR2021/008692 designating the United States, filed on Jul. 8, 2021 in the Korean Intellectual Property Receiving Office and claiming priority to Korean Patent Application No. 10-2020-0109265, filed Aug. 28, 2020, in the Korean Intellectual Property Office, the disclosures of which are incorporated by reference herein in their entireties.

BACKGROUND

Field

The disclosure relates to an electronic device, e.g., an electronic device with a foldable flexible display.

Description of Related Art

Developing electronic information communication technology integrates various functionalities into a single electronic device or portable communication device. For example, smartphones pack the functionalities of an audio player, imaging device, and scheduler, as well as the communication functionality and, on top of that, may implement more various functions by having applications installed thereon.

The user of a portable communication device or electronic device may search, screen, and obtain more information by accessing a network, but rather than simply using the own functionalities or information (e.g., applications) of the electronic device. Direct access to the network (e.g., wired communication) may enable quick and stable communication establishment but its usability may be limited to a fixed location or space. In accessing a network, wireless communication is free from locational or spatial limitations and its transmission speed or stability approaches that of direct access. In the near future, wireless communication is expected to establish communication more rapidly and stably than direct access.

As smartphones or other personal/portable communication devices spread, users' demand for portability and use convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). Flexible displays, e.g., foldable or rollable displays, will come in commerce and electronic devices are expected to deliver better portability and use convenience.

In an electronic device which is foldable or rollable, it may be difficult to secure mechanical stability as structures of the electronic device are implemented to move relative to one another (e.g., slide, rotate, or pivot). For example, it may be hard to secure both portability and stable operation structures.

There may be provided an electronic device that is foldable to allow different areas of the display to face each other or away from each other.

There may be provided an electronic device having a foldable display and capable of relative movement (e.g., pivot or slide) of the structures (e.g., housings).

Embodiments of the disclosure provide an electronic device that may stably maintain the folded or unfolded position of the flexible display.

SUMMARY

In accordance with an example embodiment, an electronic device comprises: a first housing, a second housing, a hinge module pivotably connecting the first housing and the second housing, and a flexible display disposed from a surface of the first housing through an area where the hinge module is disposed to a surface of the second housing. The hinge module may include a detent hinge at least partially receiving a pair of rotation shafts and including a cam-shaped cam surface formed in a direction perpendicular to a rotation axis of the rotation shaft, a roller contacting the cam surface and configured to rotate corresponding to the cam shape, at least one elastic member including an elastic material disposed in the direction perpendicular to the rotation axis of the rotation shaft and configured to provide an elastic force to the roller, and a detent bracket including the pair of shafts and providing a space for receiving the roller and the at least one elastic member.

In accordance with an example embodiment, an electronic device comprises: a first housing, a second housing, a hinge module pivotably connecting the first housing and the second housing, and a flexible display disposed from a surface of the first housing through an area where the hinge module is disposed to a surface of the second housing. The hinge module may include a detent hinge having a cam-shaped cam surface, a detent bracket including a pair of rotation shafts pivotably connected with the detent hinge, a roller slidingly contacting the cam surface and configured to rotate corresponding to the cam shape, at least one elastic member including an elastic material disposed in the direction perpendicular to the rotation axis of the rotation shaft and configured to provide an elastic force to the roller, a hinge bracket rotatably supporting an end of the pair of rotation shafts, a pair of rotation brackets rotatably mounted on the hinge bracket, and a slide member mounted in any one of the first housing and the second housing and slidably coupled with the rotation bracket.

As is apparent from the foregoing description, according to various example embodiments, in an electronic device (e.g., a foldable electronic device) that is foldable or unfoldable with a flexible display, a plurality of housings may be stably and simultaneously pivoted on a hinge module.

According to various example embodiments, in the foldable electronic device, the pivoting of the plurality of housings is performed symmetrically with respect to the hinge module, so that the load caused during transformation, e.g., folding or unfolding, may be evenly distributed over the entire flexible area of the flexible display. Accordingly, it is possible to prevent and/or reduce the load from being concentrated on a specific area of the flexible display, thereby improving reliability and/or durability of the flexible display.

According to various example embodiments, the foldable electronic device may remain stationary in an arbitrary angular position between the plurality of housings by interlocking the detent hinge and detent assemblies of the hinge module. Further, it is possible to provide the user with a detent feeling (e.g., a feeling of operation or haptic feedback) by which the user may identify that the operation has been done when the electronic device reaches the unfolded position or folded position.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
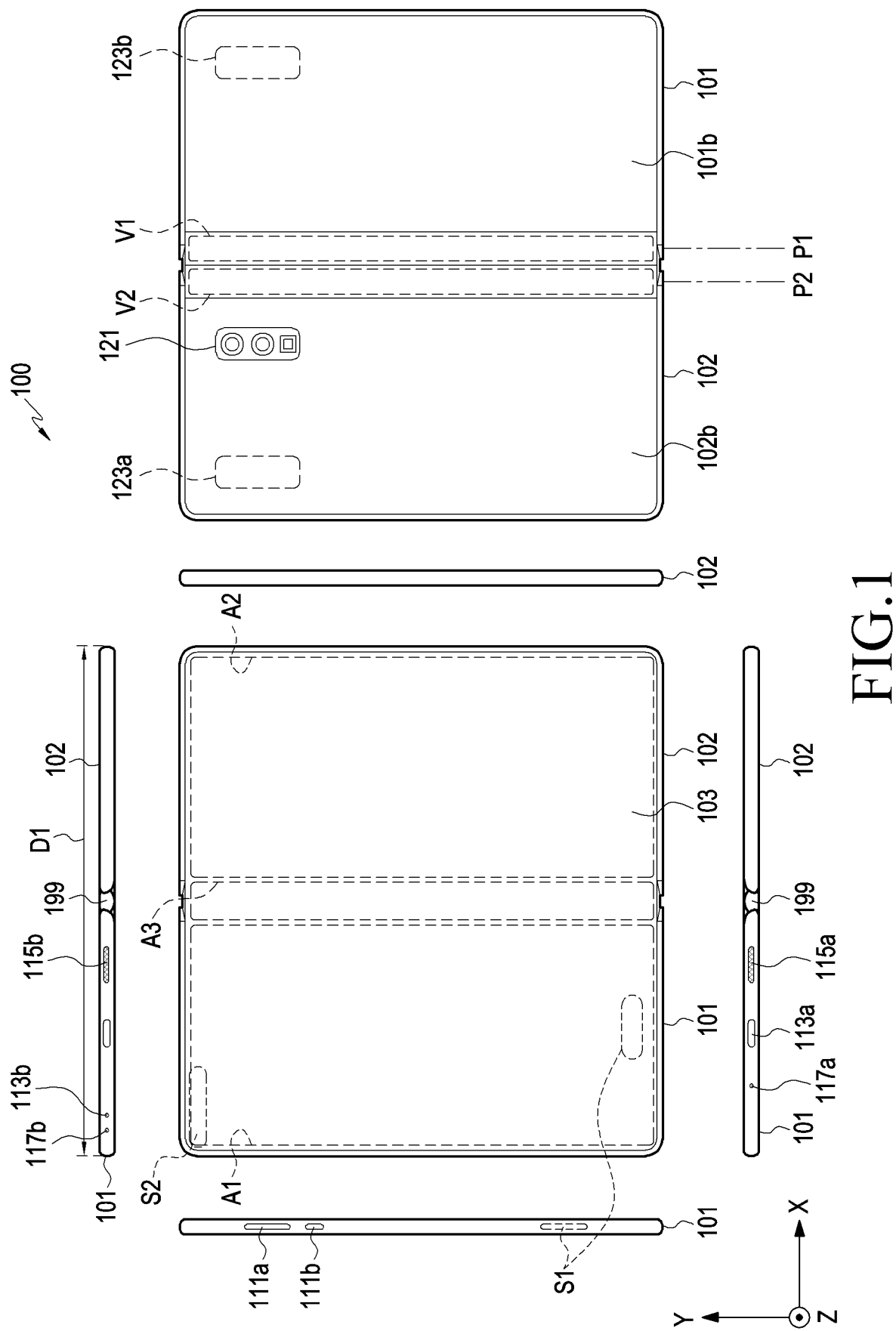
FIG. 1 is a diagram illustrating an unfolded position of an electronic device according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
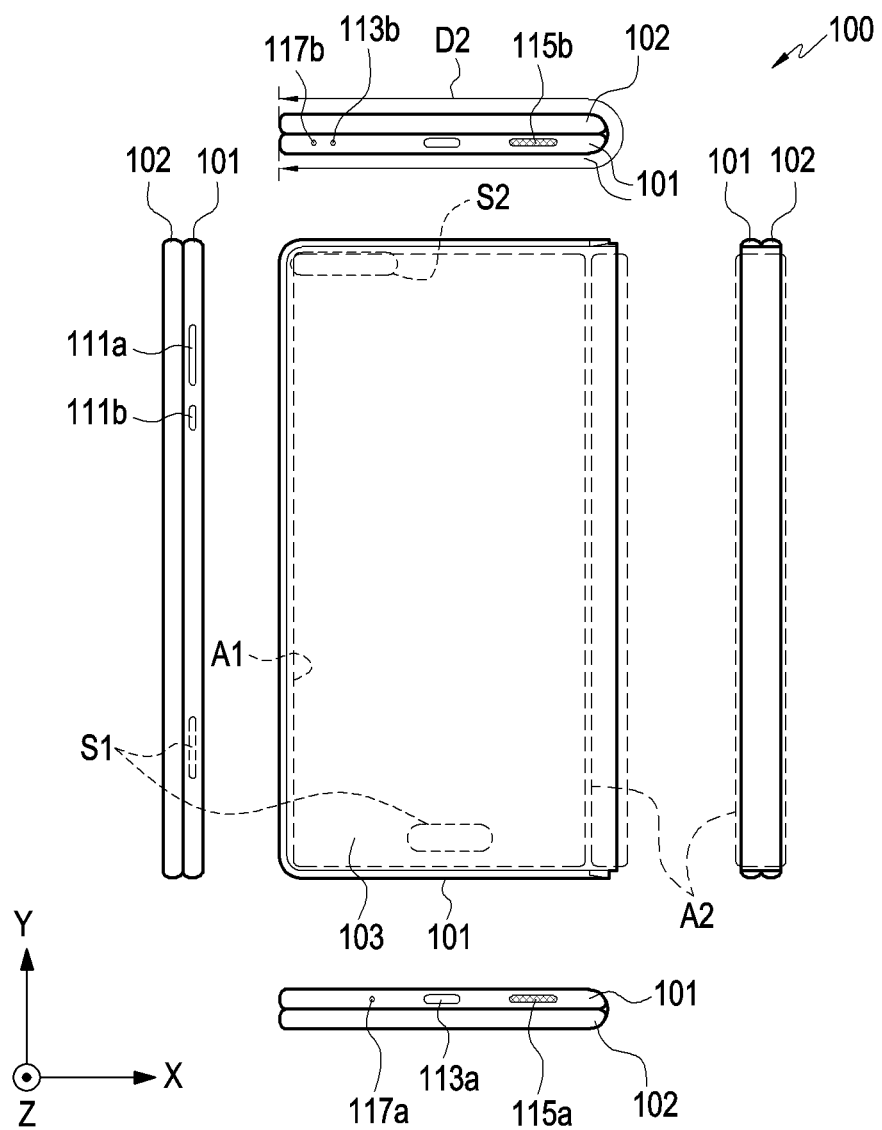
FIG. 2 is a view illustrating a folded position of an electronic device according to various embodiments.

FIG. 1 is a diagram illustrating an unfolded position of an electronic device 100 according to various embodiments. FIG. 2 is a diagram illustrating a folded position of an electronic device 100 according to various embodiments.

Figure 3:
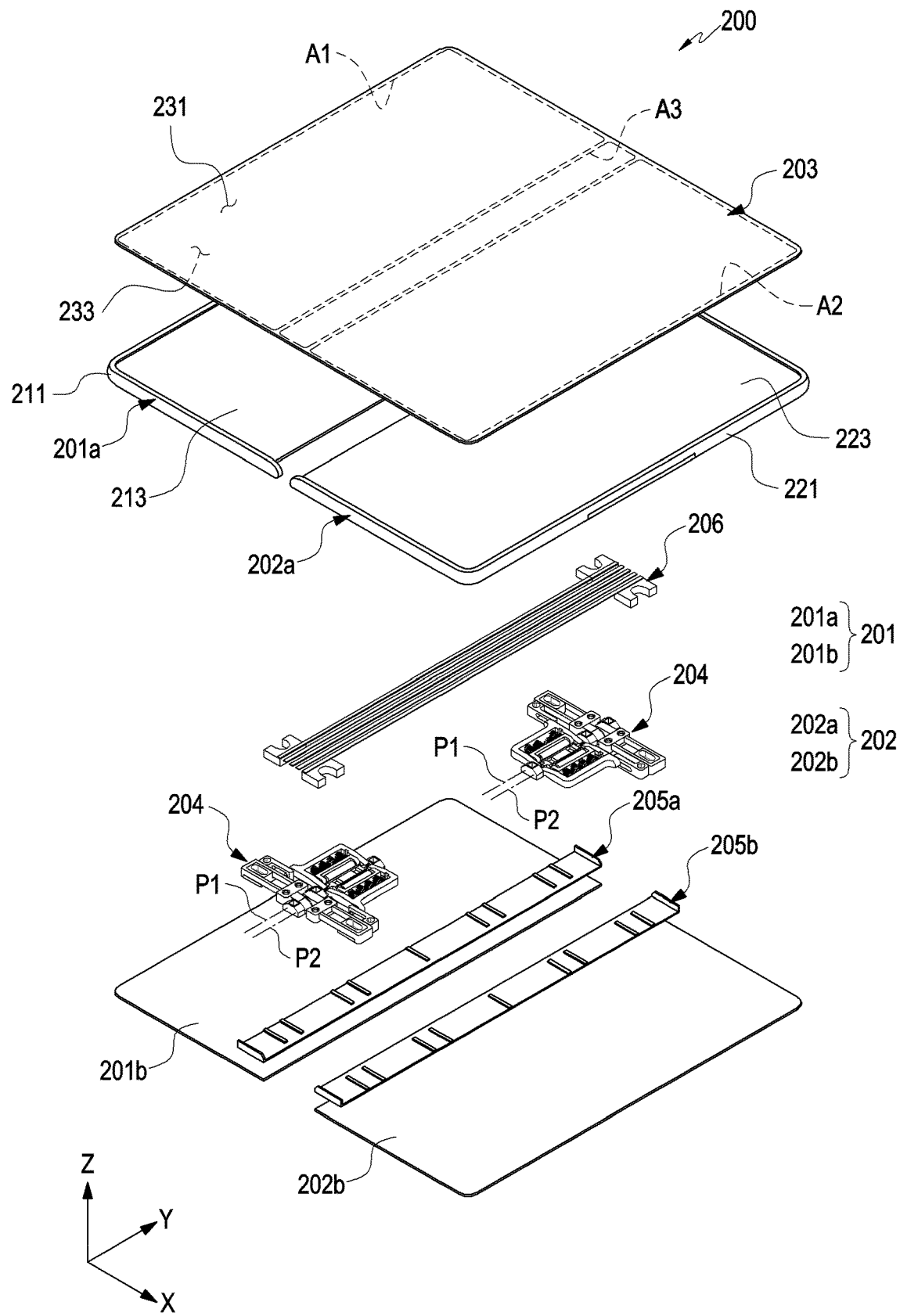
FIG. 3 is an exploded perspective view illustrating an electronic device according to various embodiments.

In describing various embodiments of the disclosure, a pair of housings (e.g., a first housing 101 and a second housing 102) are pivotably coupled to a hinge module (e.g., the hinge module 204 in FIG. 3). However, it should be noted that the electronic device 100 according to various embodiments of the disclosure is not limited thereto. For example, according to an embodiment, the electronic device 100 may include three or more housings. As used herein, a "pair of housing structures" may refer, for example, to two pivotably-coupled housings among three or more housings.

In the following detailed description, "+X/−X direction", "+Y/−Y direction" or "+Z/−Z direction" may be mentioned, and it should be noted that the Cartesian coordinate system as described below is described based on the width direction X, the length direction Y, or the thickness direction Z of the housing 101 in FIG. 1 or 2. For example, various changes may be made to the above definitions according to embodiments or when another structure of the electronic device 100 is set as the reference. Further, in the following detailed description, 'front surface' or 'rear surface' may be mentioned for the electronic device 100 or the housings 101 and 102 and, regardless of the relative positions (e.g., unfolded position or folded position) of the housings 101 and 102, the surface where the flexible display 103 of FIG. 1 is disposed may be defined as the front surface of the electronic device 100 (or housings 101 and 102), and the surface opposite to the surface where the flexible display 103 is disposed may be defined as the rear surface of the electronic device 100 (or housings 101 and 102).

Referring to FIGS. 1 and 2, the electronic device 100 may include a pair of housings 101 and 102, a flexible display 103, and a hinge module (e.g., the hinge module 204 of FIG. 3) that pivotably couple the housings 101 and 102. The electronic device 100 may further include a hinge cover(s) 199 disposed at the top and/or the bottom. The hinge cover(s) 199 may be disposed substantially between the first housing 101 and the second housing 102, and may not be visually exposed to the outside. In an embodiment, the hinge cover(s) 199 may isolate the internal space of the electronic device 100 from the external space. According to an embodiment, the hinge cover(s) 199 may be visually exposed to the outside when the electronic device 100 is in the unfolded position, and may be visually concealed when the electronic device 100 is in the folded position.

According to an embodiment, as illustrated in FIG. 1, when the electronic device 100 (e.g., the first housing 101 and the second housing 102) is in the unfolded position, the flexible display 103 may output a screen through its entire area substantially in one direction, e.g., +Z direction. As illustrated in FIG. 2, when the electronic device 100 is in the folded position, a first area A1 of the flexible display 103 may be disposed to face in the +Z direction, and a second area A2 of the flexible display 103 may be disposed to face in the −Z direction. For example, the flexible display 103 may include areas (e.g., a first area A1 and a second area A2) disposed to face away from each other in the folded position of the electronic device 100. For example, the first housing 101 and the second housing 102 may pivot between a position in which they are stretched out side-by-side and a position in which they are folded to face each other. According to an embodiment, the flexible display 103 may include a folding area A3, and in the folded position of the electronic device 100, the folding area A3 may be disposed substantially in the +X direction. For example, in the position in which the first housing 101 and the second housing 102 are folded to face each other, the flexible display 103 may be visually exposed to the outside.

According to an embodiment, the first housing 101 and/or the second housing 102 may receive the flexible display 103 in the front surface and include rear plates 101b and 102b (e.g., the first rear plate 201b and second rear plate 202b of FIG. 3) disposed on the rear surface. The electronic device 100 may include a plurality of electronic components, e.g., a circuit board, various sensor modules, a battery, an audio input/output module, a camera module, a haptic module, an antenna, and/or a connection terminal, disposed in the space between the flexible display 103 and the rear plates 101b and 102b. The first housing 101 may be coupled with the hinge module 204 to pivot about a first pivot axis P1, and the second housing 102 may be coupled with the hinge module 204 to pivot about a second pivot axis P2. According to an embodiment, the first housing 101 and the second housing 102 may be disposed to be substantially symmetrical to each other with respect to the hinge module 204. According to an embodiment, when the first housing 101 pivots about the hinge module 204, the second housing 102 may pivot in the reverse direction of the first housing 101, allowing the electronic device to fold or unfold.

According to an embodiment, the flexible display 103 may include a first area A1 disposed on a surface of the first housing 101, the folding area A3 disposed corresponding to the hinge module 204, and/or a second area A2 disposed on one surface of the second housing 102. For example, the flexible display 103 may extend from one surface of the first housing 101 through the area where the hinge module 204 is disposed to one surface of the second housing 102. Substantially, the first area A1 may be fixed to the first housing 101, and the second area A2 may be fixed to the second housing 102. The folding area A3 may be supported by a multi-bar assembly (e.g., the multi-bar assembly 206 of FIG. 3). For example, the multi-bar assembly 206 may be disposed between the first housing 101 and the second housing 102 on the front surface of the electronic device 100, supporting the flexible display 103 (e.g., the folding area A3). According to an embodiment, the flexible display 103 may output a screen through substantially the entire area of the front surface of the electronic device 100.

According to an embodiment, the width D1 measured from a side surface of the first housing 101 through the position where the hinge module 204 is disposed to a side surface of the second housing 102 along the X direction in the unfolded position may be substantially identical on the front surface (e.g., the flexible display 103) of the electronic device 100 and the rear surface of the electronic device 100. The width D2 measured from a side surface of the first housing 101 through the position where the hinge module 204 is disposed to a side surface of the second housing 102 along the X direction in the folded position may be smaller on the rear surface of the electronic device 100 than on the front surface (e.g., the flexible display 103) of the electronic device 100. Since the first area A1 and the second area A2 of the flexible display 103 are fixed to the first housing 101 and the second housing 102, and the width measured along the X direction is not substantially variable in the flexible display 103, the width measured along the X direction on the rear surface of the electronic device 100 may be varied. For example, a variation in the width measured along the X direction on the rear surface of the electronic device 100 may be implemented as a portion of the rear surface (e.g., the area indicated with 'V1' and/or 'V2') of the electronic device 100 is contracted or expanded. According to an embodiment, the variation in the width measured along the X direction on the rear surface of the electronic device 100 may be implemented as the first housing 101 and/or the second housing 102 slides on the hinge module 204. According to an embodiment, as the first housing 101 and/or the second housing 102 slides on the hinge module 204, and the area indicated with 'V1' and/or 'V2' is contracted or expanded on the rear surface of the electronic device 100, corresponding to the slide of the first housing 101 and/or the second housing 102, the width measured along the X direction may be varied.

According to an embodiment, the variation in the length of the rear surface of the electronic device 100 according to the folding or unfolding may be proportional to the interval between the flexible display 103 and the rear surface of the electronic device 100. For example, as the thickness of the electronic device 100, measured in the Z direction increases, the variation in the length of the rear surface of the electronic device 100 according to folding or unfolding may increase.

According to an embodiment, the electronic device 100, e.g., the first housing 101 and/or the second housing 102, may include at least one sensor area S1 and S2 where at least one sensor module is provided. For example, the electronic device 100 may include a first sensor area S1 provided on the front surface or side surface of the first housing 101 and/or a second sensor area S2 provided on the front surface. For example, a fingerprint recognition sensor may be disposed in the first sensor area S1. The fingerprint recognition sensor may include, e.g., an optical fingerprint recognition sensor or an ultrasonic fingerprint recognition sensor and may be disposed on a side surface of the first housing 101 (or the second housing 102) or inside the flexible display 103. The electronic device 100 may include a sensor module provided in the second sensor area S2, e.g., a camera module, a proximity sensor, an illuminance sensor, an iris recognition sensor, an ultrasonic sensor, or an indicator. The sensor module(s) in the second sensor area S2 may be disposed inside the flexible display 103.

According to an embodiment, the electronic device 100 may include a notch portion protruding from the second sensor area S2 to the first area A1 of the flexible display 103. The notch portion may be a structure forming the first housing 101 (or the second housing 102), and at least part of the sensor modules may be disposed in the notch portion. The notch portion may have a polygonal shape, a circular shape, or an elliptical shape. In an embodiment, in the second sensor area S2, the flexible display 103 may include a transparent area that permits external light to enter the inside. For example, among the sensor modules, an optical sensor, such as a camera module or a proximity sensor, may be disposed corresponding to the transparent area of the flexible display 103. According to an embodiment, the electronic device 100 (e.g., the sensor areas S1 and S2 or the sensor module) is not limited to the above-described configuration, and may include an additional sensor area or additional sensor module according to the function equipped in the electronic device 100 or the function of each sensor module. According to an embodiment, the electronic device 100 may not include some of the above-mentioned sensor modules.

According to an embodiment, the electronic device 100 may include a camera module 121 disposed on the rear surface (e.g., the rear surface of the second housing 102). According to an embodiment, the camera module 121 may be interpreted as one of the sensor modules and may include a plurality of cameras, at least one infrared (IR) projector, at least one IR receiver, or a flash. The user may capture the object using the camera module 121 provided on the rear surface of the electronic device 100 (e.g., the second housing 102). According to an embodiment, the camera module 121 may be disposed in different positions, e.g., the position indicated with reference numeral '123a' or '123b' and the electronic device 100 may further include an additional camera module or sensor module in a position different from the position indicated in FIG. 1.

According to an embodiment, the electronic device 100 may include at least one key input device 111a and 111b disposed on a side surface of the first housing 101 (and/or the second housing 102). The key input devices 111a and 111b may include, e.g., a volume control key 111a and/or a power key 111b and, according to an embodiment, the key input devices 111a and 111b shown may be omitted, or an additional key input device may be provided. According to an embodiment, the electronic device 100 may further include a soft key provided through the flexible display 103.

According to an embodiment, the electronic device 100 may include at least one connector hole 113a and 113b formed on a side surface of the electronic device 100 (e.g., a side, top, and/or bottom surface of the first housing 101 and/or the second housing 102) The connector holes 113a and 113b may include, e.g., a first connector hole 113a for charging/data cable connection and a second connector hole 113b for audio device (e.g., earphone) connection. According to an embodiment, the data cable may refer, for example, to a cable provided to an audio device. For example, the electronic device 100 may not include the second connector hole 113b and connect to the audio device via the first connector hole 113a. According to an embodiment, the electronic device 100 may not include the connector holes 113a and 113b. For example, the electronic device 100 may connect to another electronic device 100 or an additional device, e.g., an earphone, wirelessly, by including a function, such as wireless charging, Bluetooth communication, wireless fidelity (Wi-Fi) direct, or infrared data association (IrDA).

According to an embodiment, the electronic device 100 may include a plurality of audio output holes 115a and 115b and a plurality of audio input holes 117a and 117b. In the illustrated embodiment, the audio output holes 115a and 115b may be formed on the top and bottom, respectively, of the first housing 101 (and/or the second housing 102). According to an embodiment, the audio output holes 115a and 115b may be formed on a side surface of the first housing 101 and an audio surface of the second housing 102, respectively. The audio input holes 117a and 117b may be formed on the top and bottom, respectively, of the electronic device 100, e.g., the first housing 101. The electronic device 100 may obtain the external audio through the plurality of audio input holes 117a and 117b, thereby performing such function as audio beam forming, active noise canceling (ANC), echo canceling (EC), noise suppression (NS), and/or feedforward (FF) in audio call or audio recording mode. According to an embodiment, an audio input hole not shown may further be formed in the rear surface of the first housing 101 (and/or the second housing 102). The electronic device 100 may obtain the external audio in capture mode, through the audio input hole formed in the rear surface of the first housing 101. As the number of audio input holes 117a and 117b and directions oriented are diversified, the electronic device 100 may provide better performance in audio beamforming, active noise canceling (ANC), echo canceling (EC), noise suppression (NS), and/or feed forward (FF).

According to an embodiment, in the unfolded position, the first housing 101 and the second housing 102 may be disposed to form a designated angle, e.g., 180 degrees, therebetween. When the electronic device 100 unfolds to the designated angle, the flexible display 103 may output a screen through substantially the entire area in the +Z direction. According to an embodiment, the first housing 101 and the second housing 102 may be unfolded obliquely between the position in which they are folded to face each other and the position of the designated angle. In the obliquely unfolded position, the first area A1 and the second area A2 of the flexible display 103 may output screens in different directions. For example, when unfolded obliquely, the electronic device 100 may provide screens to two users who sit facing each other. When the screen is output in the obliquely unfolded position, the screen output from the first area A1 and the screen output from the second area A2 may be the same as or different from each other.

According to an embodiment, in the folded position, the flexible display 103 may be substantially visually exposed to the outside. For example, the electronic device 100 may output a screen using the first area A1, the second area A2, and/or the folding area A3. According to an embodiment, in the standby mode, the electronic device 100 may deactivate the screen of the flexible display 103 and activate a partial area according to a designated setting. For example, in the standby mode, the electronic device 100 may at least partially activate the first area A1 to output daily information, such as time or weather. According to an embodiment, in the standby mode, the electronic device 100 may activate at least one of the first area A1, the second area A2, and/or the folding area A3 to provide visual information about the operation state or display notification information, such as messages or news.

According to an embodiment, the radius of curvature of the folding area A3 of the flexible display 103 may be varied when the electronic device 100 is folded or unfolded. For example, as the electronic device 100 is gradually unfolded from the folded position, the radius of curvature of the folding area A3 may gradually increase. In the folding or unfolding operation, the electronic device 100 may adjust a screen output through the folding area A3. For example, the electronic device 100 may compensate for distortion of the output screen according to the transformation of the folding area A3 by adjusting the horizontal-vertical ratio of the screen in the folding area A3 according to a change in the radius of curvature.

Figure 4:
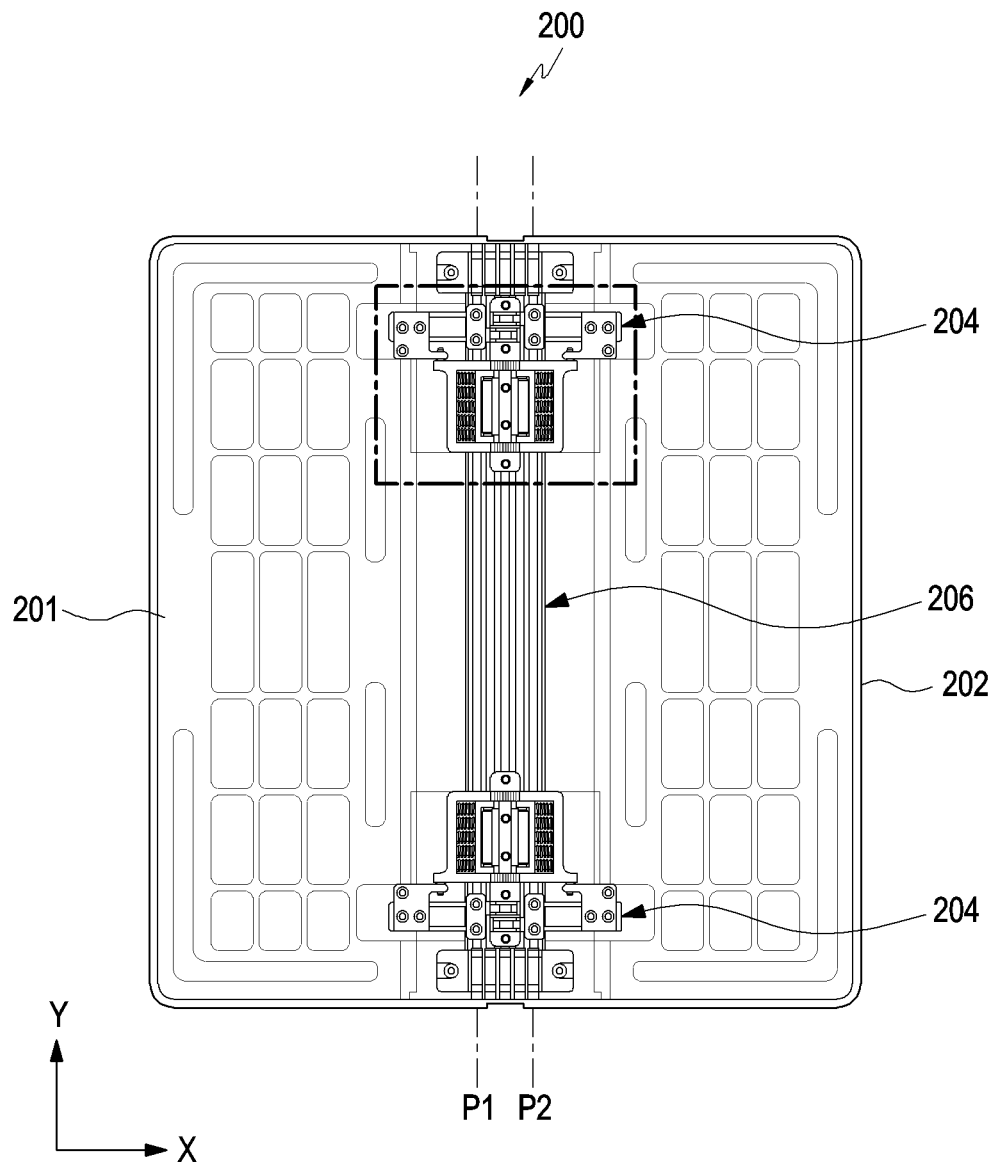
FIG. 4 is a diagram illustrating an example connected structure of a first housing and a second housing in an electronic device according to various embodiments.

FIG. 3 is an exploded perspective view illustrating an electronic device 200 (e.g., the electronic device 100 of FIG. 1 and/or 2) according to various embodiments. FIG. 4 is a diagram illustrating an example structure in which a first housing 101 and a second housing 102 are connected in an electronic device 200 according to various embodiments.

Referring to FIGS. 3 and 4, an electronic device 200 (e.g., the electronic device 100 of FIG. 1 and/or FIG. 2) may include a first housing 201 (e.g., the first housing 101 of FIG. 1 and/or FIG. 2), a second housing 202 (e.g., the second housing 102 of FIG. 1 and/or FIG. 2) pivotably connected with the first housing 201, and at least one hinge module 204 and/or a flexible display 203 (e.g., the flexible display 103 of FIG. 1 and/or FIG. 2) pivotably coupling the first housing 201 and the second housing 202. The flexible display 203 may be disposed from one surface, e.g., the front surface, of the first housing 201 through the area in which the hinge module 204 is disposed to one surface (e.g., the front surface) of the second housing 202.

According to an embodiment, the first housing 201 may include a first housing member 201a and a first rear plate 201b coupled to the first housing member 201a. The second housing 202 may include a second housing member 202a and a second rear plate 202b coupled to the second housing member 202a.

The first housing 201 and the second housing 202 may have substantially the same structure and may partially differ depending on the electronic components disposed therein. For example, when the camera module 121 of FIG. 1 is disposed in one of the first housing 201 and the second housing 202, there may be a slight difference in the shape of the first housing 201 and the second housing 202 (e.g., the first rear plate 201b and the second rear plate 202b) or the mechanical structure of the first housing member 201a and the second housing member 202a. Such difference between the first housing 201 and the second housing 202 may be varied depending on the products actually manufactured.

According to an embodiment, the first housing member 201a may substantially form the outer appearance of the electronic device 200 (e.g., the first housing 201) and may include a first side bezel structure 211 and a first support plate 213. The first side bezel structure 211 may be a frame shape forming the side surface (e.g., the left side surface of FIG. 1), top and/or bottom of the first housing 201, and be open in the direction adjacent to the second housing 202. According to an embodiment, the first side bezel structure 211 may include a metal and/or polymer. For example, the first side bezel structure 211 may at least partially include a metal and/or electrically conductive material, thereby functioning as an antenna of the electronic device 200. According to an embodiment, the first side bezel structure 211 may include various coat layers, decorating the outer appearance of the electronic device 200 or providing an electrical insulation structure.

According to an embodiment, the first support plate 213 may be disposed in the space between the flexible display 203 and the first rear plate 201b and be connected with the first side bezel structure 211. According to an embodiment, the first support plate 213 may be integrally formed with the first side bezel structure 211 and may include the same material, e.g., metal and/or polymer, as the first side bezel structure 211. According to an embodiment, the first support plate 213 may include a metal and/or electrically conductive material, thereby providing an electromagnetically shielding structure inside the electronic device 200. According to an embodiment, the first support plate 213 may include a metal and/or electrically conductive material, functioning as a ground conductor that provides a reference potential inside the electronic device 200. According to an embodiment, the flexible display 103 (e.g., the first area A1) may be positioned on the outer surface of the first support plate 213.

According to an embodiment, the first rear plate 201b may be formed by laminated or colored glass, ceramic, polymer, metal (e.g., aluminum, stainless steel (STS), or magnesium), or a combination of at least two thereof). According to an embodiment, the first rear plate 201b may be formed substantially integrally with the first housing member 201a, e.g., the first side bezel structure 211. According to an embodiment, the first rear plate 201b may at least partially include a curved area. For example, an edge portion of the first rear plate 201b adjacent to the first side bezel structure 211 may include a portion that is bent towards the front surface (e.g., the surface where the flexible display 203 is disposed) of the electronic device 200 and seamlessly extended. In an embodiment, the first rear plate 201b may be disposed to be inclined with respect to the first area A1 of the flexible display 103. For example, if the first rear plate 201b is located at a first height from the first area A1 of the flexible display 203 at the edge adjacent to the second housing 202, it may be located at a second height lower than the first height at the end in the -X direction.

According to an embodiment, the space between the first support plate 213 and the first rear plate 201b may be at least partially surrounded by the first side bezel structure 211. Although not shown, the electronic device 200 may receive various electronic components, such as a printed circuit board, a battery, a haptic module, a camera module, a sensor module(s) and/or connection terminals, in the space between the first support plate 213 and the first rear plate 201b. For example, the first support plate 213 may be used as a structure that prevents and/or obstructs other electronic components of the electronic device 200 from contacting the flexible display 203. Some of the electronic components received in the electronic device 200, e.g., a camera module (e.g., the camera module 121 of FIG. 1), may be partially exposed to an external space. Here, a component "exposed to the external space" may refer, for example, to including a component that is isolated from the external space but is visually exposed and/or a component that is exposed to be directly contacted by the user. A processor, memory, and/or interface may be positioned on the printed circuit board.

The processor may include various processing circuitry including one or more of, e.g., a central processing unit, an application processor, a graphic processing device, an image signal processing, a sensor hub processor, or a communication processor. A battery may be a device for supplying power to at least one component of the electronic device 200. The battery may include, e.g., a primary cell which is not rechargeable, a secondary cell which is rechargeable, or a fuel cell. At least a portion of the battery may be disposed substantially coplanar with the printed circuit board, for example between the first support plate and the first rear plate. The battery may be integrally or detachably disposed inside the electronic device 200.

According to an embodiment, an additional support plate and/or an antenna, not shown, may be provided in the space between the first support plate 213 and the first rear plate 201b. The additional support plate may enhance mechanical rigidity of the electronic device 200 and may provide an electromagnetic shielding structure between the electronic components inside the electronic device 200. The antenna may be disposed between the first support plate 213 (and/or an additional support plate not shown) and the first rear plate 201b. The antenna may include, e.g., a near field communication (NFC) antenna, a wireless charging antenna, and/or a magnetic secure transmission (MST) antenna, performing short-range communication with an external device or wirelessly transmitting/receiving power required for charging. According to an embodiment of the disclosure, an antenna structure may be formed by a portion or combination of the first side bezel structure 211 and/or the first support plate 213.

According to an embodiment, the second housing 202 may include a second housing member 202a (e.g., a second side bezel structure 221 and a second support plate 223) and a second rear plate 202b and, since it may have a similar structure to the structure of the first housing 201, a detailed description thereof will be omitted. According to an embodiment, as mentioned above, since electrical components disposed in the first housing 201 and/or the second housing 202, e.g., the key input devices 111a and 111b of FIG. 1, the sensor areas S1 and S2, and/or the camera module 121, may be different from each other, the second housing 202 may be partially different in shape or structure from the first housing 201.

According to an embodiment, the hinge module 204 may pivotably couple the second housing 202 to the first housing 201. According to an embodiment, the first housing 201 may be coupled with the hinge module 204 to pivot about a first pivot axis P1, and the second housing 202 may be coupled with the hinge module 204 to pivot about a second pivot axis P2. For example, the first housing 201 and the second housing 202 which are in the unfolded position may be pivoted in reverse directions with respect to each other and folded. The first housing 201 and the second housing 202 which are in the folded position may be pivoted in reverse directions with respect to each other and unfolded up to a designated angle. Here, the "designated angle" may, for example, be about 180 degrees.

According to an embodiment, the hinge module 204 may interlock the pivoting of the second housing 202 with the pivoting of the first housing 201. For example, when the first housing 201 pivots in a first direction (e.g., clockwise when viewed in the state illustrated in FIG. 3) around the first pivot axis P1, the hinge module 204 may pivot the second housing 202 in a second direction (e.g., counterclockwise when viewed in the state illustrated in FIG. 3) opposite to the first direction. According to an embodiment, the hinge module 204 may provide a friction force when the first housing 201 and/or the second housing 202 pivots. For example, when the user applies a certain degree of external force, the hinge module 204 may allow the first housing 201 and/or the second housing 202 to pivot, and if no external force is applied, the hinge module 204 may keep the first housing 201 and/or the second housing 202 stationary. In an embodiment, the hinge module 204 may keep the first housing 201 and/or the second housing 202 stationary in the position of the designated angle (e.g., the folded 0-degree position, the unfolded 180-degree position, and/or a position obliquely unfolded at about 120 degrees to about 160 degrees) using a detent structure (e.g., the detent part 204c of FIG. 5).

According to an embodiment, the flexible display 103 may include a display panel 231 and a display protective layer 233. The display panel 231 may include a light emitting layer formed between transparent substrates, and the transparent substrate may include an electronic circuit, such as a touch sensor. For example, the display panel 231 may be formed of, e.g., organic light emitting diodes (OLEDs) or micro LEDs to output visual information, and may detect the user's direct contact to the display panel 231 or the user's motion within a certain distance. The display protective layer 233 may attach the display panel 231 to the first housing 201 and/or the second housing 202, may include an elastic material, and may be utilized as a cushioning material between the display panel 231 and the mechanical structure (e.g., the first housing 201 and/or the second housing 202).

According to an embodiment, the flexible display 203 may include a first area A1 mounted or fixed to the first housing 201, a second area A2 positioned in the second housing 202, and a folding area A3 connecting the first area A1 and the second area A2. The folding area A3 may be disposed substantially corresponding to the area in which the hinge module 204 is disposed and may be transformed into a flat or curved shape as the electronic device 200 (e.g., the electronic device 100 of FIG. 1 and/or FIG. 2) folds or unfolds. When the electronic device 200 is in the unfolded position, the flexible display 203 may output a screen in one direction using substantially the entire area. When the electronic device 200 is in the folded position, the flexible display 203 may output screens in different directions using the first area A1 and the second area A2.

According to an embodiment, the electronic device 200 may further include a first slide plate 205a and a second slide plate 205b. The first slide plate 205a may be positioned on the first housing member 201a (e.g., the first support plate 213), and a portion of the hinge module 204 may be coupled to slide between the first support plate 213 and the first slide plate 205a. The second slide plate 205b may be positioned on the second housing member 201a (e.g., the second support plate 223), and a portion of the hinge module 204 may be coupled to slide between the second support plate 223 and the second slide plate 205b. For example, the first slide plate 205a and the second slide plate 205b may couple the first housing 201 and/or the second housing 202 to the hinge module 204, guiding or supporting the slide of the first housing 201 and/or the second housing 202. According to an embodiment, the first slide plate 205a and/or the second slide plate 205b may not be included in the electronic device 200.

According to an embodiment, the electronic device 200 (e.g., the electronic device 100 of FIG. 1 and/or FIG. 2) may further include a multi-bar assembly 206. The multi-bar assembly 206 may be disposed corresponding to the area in which the hinge module 204 is disposed and may connect the first support plate 213 and the second support plate 223. For example, the multi-bar assembly 206 may be disposed to support the folding area A3 of the flexible display 203. According to an embodiment, the multi-bar assembly 206 may include multiple (e.g., five) bars or rods extending in one direction. The bars or rods of the multi-bar assembly 206 may have a circular, elliptical, or polygonal cross-section, and may be arranged in parallel with the length direction Y of the electronic device 200, e.g., the rotation axis (P1 or P2). According to an embodiment, the multiple bars or rods may be arranged along the width direction (X-axis) of the electronic device 200 to be pivotably connected with another adjacent bar or rod. As the bars or rods are pivoted with respect to another adjacent bar or rod, the multi-bar assembly 206 may be transformed into a flat or curved shape. For example, when the electronic device 200 is folded or unfolded, the multi-bar assembly 206 may support the folding area A3 while transforming to correspond to the folding area A3 of the flexible display 203. When an external object or the user contacts the folding area A3 in the unfolded position of the electronic device 200, the multi-bar assembly 206 may support the folding area A3, suppressing the transformation of the folding area A3.

Figure 5:
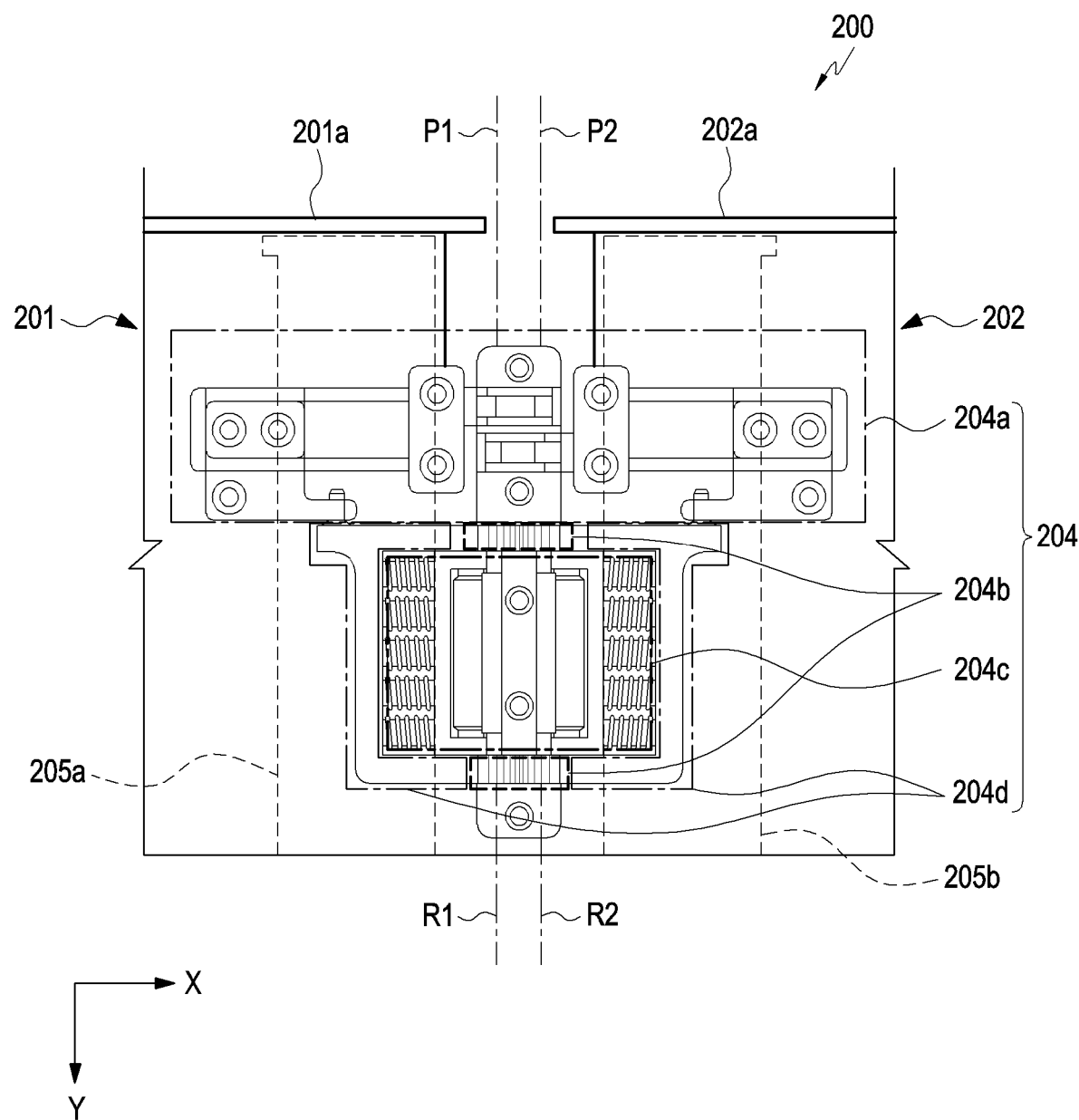
FIG. 5 is a diagram illustrating an example structure in which a hinge module is placed in an electronic device according to various embodiments.

FIG. 5 is a diagram illustrating an example structure in which a hinge module 204 is disposed in an electronic device 200 (e.g., the electronic device 100 of FIG. 1 and/or FIG. 2) according to various embodiments.

Referring to FIG. 5 along with FIGS. 1, 2, 3 and 4, the hinge module 204 may include a first rotation part 204*a*, an interlocking part 204*b*, a detent part 204*c*, and/or a second rotation part 204*d*. The first rotation part 204*a* is a part that substantially implements or guides the rotation of the first housing 101 and/or the second housing 202, and the pivot axis P1 or P2 may be configured by the structure of the first rotation part 204*a*. The interlocking part 204*b* may interlock the first housing 201 (e.g., the first housing member 201*a*) and the second housing 202 (e.g., the second housing member 202*a*) using a structure in which a plurality of (e.g., one or two pairs of) gears (e.g., the gears 372 of FIG. 7) are sequentially engaged with each other. For example, among the gears of the interlocking part 204*b*, a first gear is rotated as the first housing 201 pivots and, among the gears of the interlocking part 204*b*, a second gear may be rotated in a different direction (e.g., reverse direction) from the first gear as the second housing 202 pivots. For example, the first gear and the second gear may be spur gears, and may be engaged with each other to interlock the pivoting of the first housing 201 and the pivoting of the second housing 202. According to an embodiment, the rotation axis (e.g., a first rotation axis R1) of the first gear and the rotation axis (e.g., a second rotation axis R2) of the second gear may be arranged in parallel with the pivot axis P1 or P2 in positions spaced apart from the pivot axis P1 or P2.

According to an embodiment, the detent part 204*c* may maintain a designated angle between the first housing 201 and the second housing 202 when the first housing 201 and/or the second housing 202 pivots and notify the user of the unfolded position and/or the folded position. For example, when the user applies a certain degree of external force, the hinge module 204 may allow the first housing 201 and/or the second housing 202 to pivot, and keep the first housing 201 and/or the second housing 202 stationary in the position of the designated angle using the cam structure provided in the detent part 204*c*. As another example, when the user applies a certain degree of external force, the hinge module 204 may permit a pivoting of the first housing 201 and/or the second housing 202 and, upon reaching the unfolded position and/or the folded position, indicate to the user that the operation has been done via a feeling of detent (e.g., a feeling of operation).

According to an embodiment, the second rotation part 204*d*, together with the first rotation part 204*a*, may implement or guide a rotational operation of the first housing 201 and/or the second housing 202. According to an embodiment, the second rotation part 204*d* may stably maintain the pivoting of the hinge module 204 and the first housing 201 and/or the second housing 202. The second rotation part 204*d* may be integrally formed with the interlocking part 204*b*, and may pivot around the rotation part 204*d* and/or the rotation axis R1 and/or R2 of the interlocking part 204*b*. For example, a slide pole (e.g., a slide pole 376 of FIG. 6) may be formed at an end of the second rotation part 204*d* to compensate for the difference in length between the rotation axis R1 and/or R2 of the second rotation part 204*d* and the pivot axis P1 or P2 of the first rotation part 204*a*. Therefore, the second rotation part 204*d* may be stably pivoted along with the first housing 201 and/or the second housing 202 that rotates around the pivot axis P1 or P2. As another example, a slide pole (e.g., the slide pole 376 of FIG. 6) that may move in the second rotation part 204*d* may be formed at an end of the second rotation part 204*d*, suppressing relative angular displacement between the second rotation part 204*d* and the first housing 201 and/or between the second rotation part 204*d* and the second housing 202. Therefore, the second rotation part 204*d* may be pivoted substantially along with the first housing 201 and/or the second housing 202 without relative angular displacement, providing a stable coupling structure between the hinge module 204 and the first housing 201 and/or the second housing 202.

According to an embodiment, the first rotation part 204*a* and the second rotation part 204*d* may be at least partially positioned between the first support plate 213 and the first slide plate 205*a* and/or between the second support plate 223 and the second slide plate 205*b*. For example, a surface contact structure may be provided between the rotation parts (e.g., the first rotation part 204*a* and/or the second rotation part 204*d*) and the housings (e.g., the first housing 201 and/or the second housing 202) to suppress relative angular displacement between the second rotation part 204*d* and the first housing 201 and/or the second rotation part 204*d* and the second housing 202.

In the following description, the electronic devices 100 and 200 of FIGS. 1, 2, 3 and 4 and/or the hinge module 204 of FIG. 5 may be referred to as necessary. In the following examples, the components identical to those in the above embodiments or easy to understand from the description of the above embodiments are denoted with or without the same reference numerals and their description may not be repeated.

Figure 6:
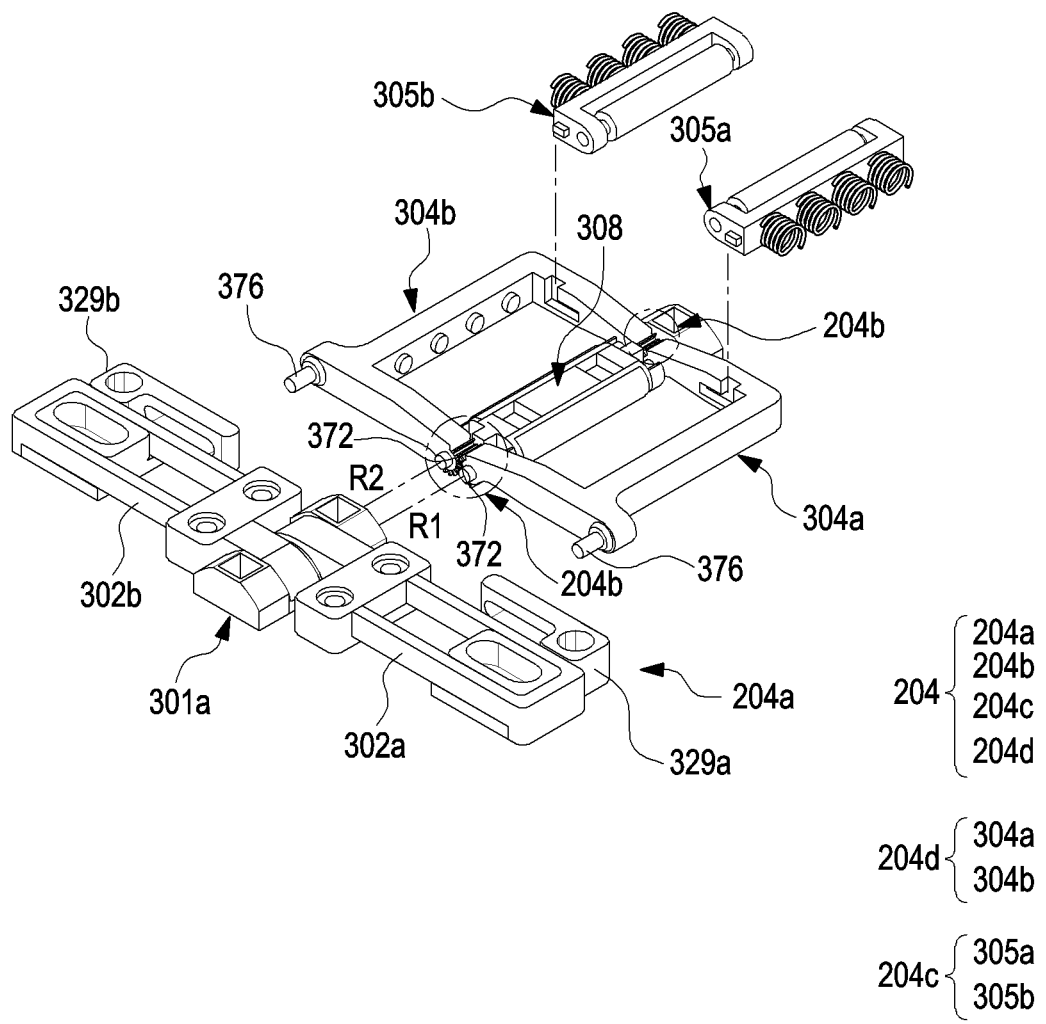
FIG. 6 is an exploded perspective view illustrating an example hinge module of an electronic device according to various embodiments.
Figure 7:
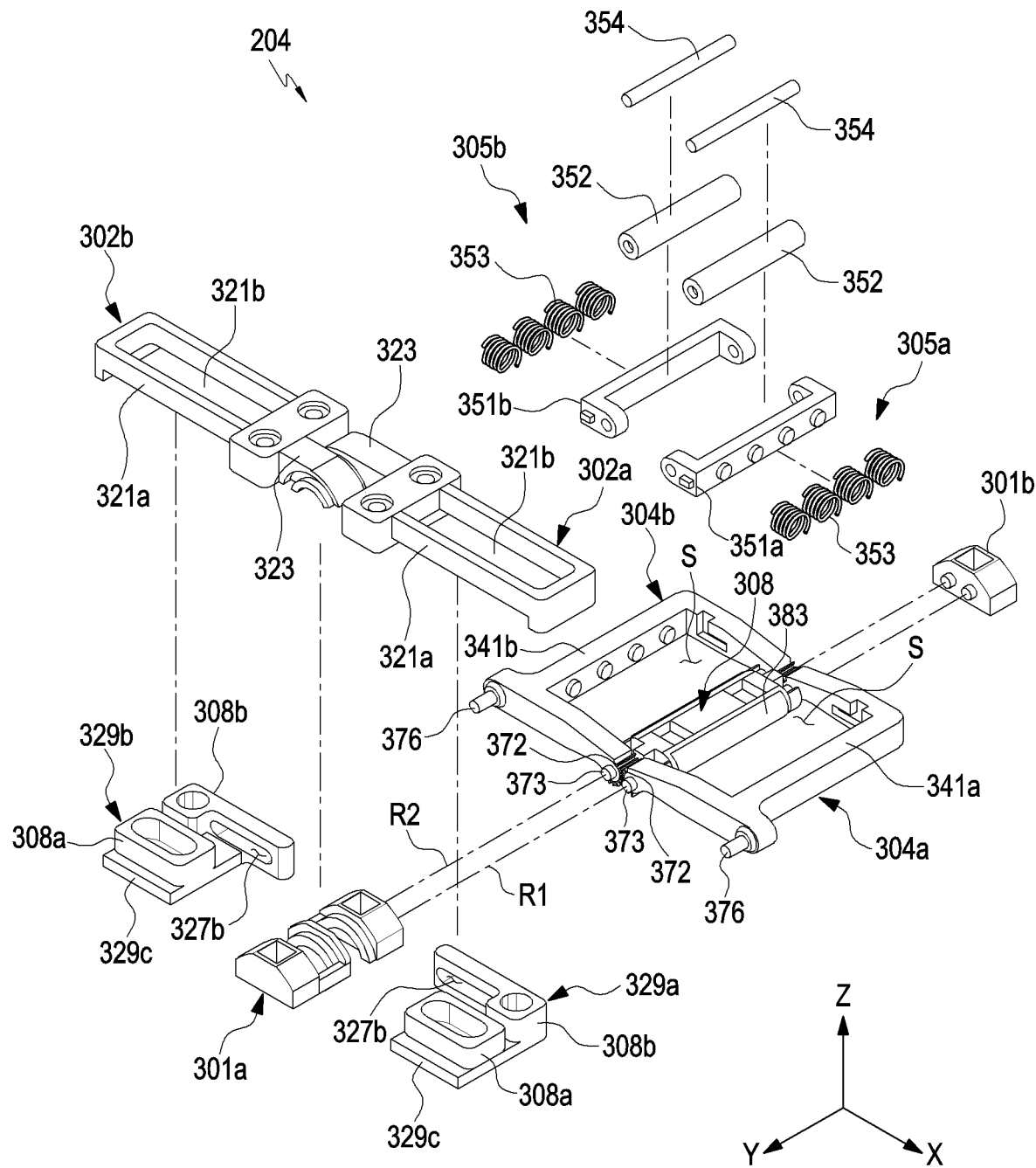
FIG. 7 is an exploded perspective view illustrating of the hinge module of FIG. 6 according to various embodiments.
Figure 8:
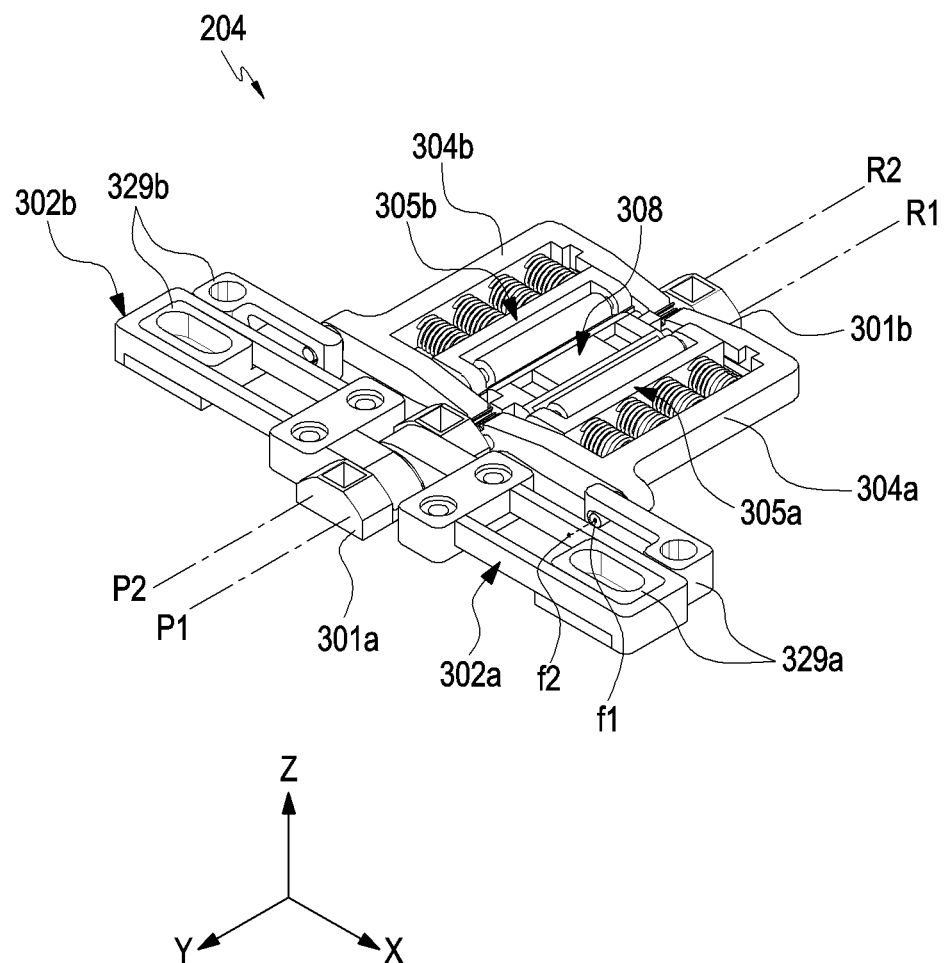
FIG. 8 is a perspective view illustrating an example assembled hinge module of an electronic device according to various embodiments.

FIG. 6 is an exploded perspective view illustrating an example hinge module 204 in an electronic device 200 (e.g., the electronic device 100 of FIG. 1 and/or FIG. 2) according to various embodiments. FIG. 7 is an exploded perspective view illustrating the hinge module 204 of FIG. 6 according to various embodiments. FIG. 8 is a perspective view illustrating an assembled hinge module 204 of an electronic device 200 according to various embodiments.

According to an embodiment, a hinge module 204 (e.g., the hinge module 204 of FIG. 5) may include a first rotation part 204*a*, an interlocking part 204*b*, a detent part 204*c*, and/or a second rotation part 204*d*. The configuration of the first rotation part 204*a*, interlocking part 204*b*, detent part 204*c*, and/or second rotation part 204*d* of FIGS. 6, 7 and 8 may be wholly or partially identical to the configuration of the first rotation part 204*a*, interlocking part 204*b*, detent part 204*c*, and/or second rotation part 204*d* of FIG. 5.

According to an embodiment, the hinge module 204 may include a hinge bracket (e.g., a first hinge bracket 301*a* and a second hinge bracket 301*b*), and a rotation bracket (e.g., a first rotation bracket 302*a* and a second rotation bracket 302*b*). In a structure that is slidably coupled to a housing (e.g., the first housing 201 and the second housing 202 of FIG. 3) of the electronic device (e.g., the electronic device 200 of FIGS. 3, 4 and 5), the hinge module 204 may further include a slide member (e.g., a first slide member 329*a* and a second slide member 329*b*), a detent hinge 308, a detent bracket (e.g., a first detent bracket 304*a* and a second detent bracket 304*b*), and a detent assembly (e.g., a first detent assembly 305*a* and a second detent assembly 305*b*).

According to an embodiment, the first slide member 329*a* may be disposed to face at least a portion of the first support plate (e.g., the first support plate 213 of FIG. 3), and may be coupled with the first slide plate (e.g., the first slide plate 205*a* of FIG. 3). The second slide member 329*b* may be disposed to face at least a portion of the second support plate (e.g., the second support plate 223 of FIG. 3), and may be coupled with the second slide plate (e.g., the second slide plate 205*b* of FIG. 3). The slide members 329*a* and 329*b* may include first members 308*a* interlocking with the rotation brackets 302a and 302b and second members 308b extending from the first members 308a and at least partially interlocking with the detent poles 376 of the detent brackets 304a and 304b.

According to an embodiment, the first members 308a of the slide members 329a and 329b may be positioned (e.g., mounted or fixed) in the housings 201 and 202 of the electronic device 200, and slidably coupled with the rotation brackets 302a and 302b. For example, the first members 308a of the slide members 329a and 329b may be slidably received in the guide holes 321b formed in the rotation brackets 302a and 302b. According to an embodiment, the first members 308a of the slide members 329a and 329b may include slide ribs 329c and may thus be coupled substantially in line or surface contact with the rotation brackets 302a and 302b.

According to an embodiment, the second members 308b of the slide members 329a and 329b may be positioned (e.g., mounted or fixed) in the housings 201 and 202 of the electronic device 200, and slidably coupled with the detent brackets 304a and 304b. The second members 308b of the slide members 329a and 329b may include slide grooves 327b formed in positions corresponding to the slide poles 376 of the detent brackets 304a and 304b. The slide grooves 327b may have a trajectory extending substantially in the X-axis direction, and may be opened in the Y direction which is perpendicular to the direction in which the guide holes 321b of the rotation brackets 302a and 302b are opened. For example, the slide poles 376 of the detent brackets 304a and 304b may be slidably received in the slide grooves 327b.

According to an embodiment, the sliding movement (or guiding sliding movement) of the slide members 329a and 329b may enhance the stability and mechanical reliability of the operation of the electronic device 200 not to cause relative angular displacement between the slide members 329a and 329b and the detent brackets 304a and 304b when the first housing 201 and/or the second housing 202 is pivoted by an external force. For example, when the housings 201 and 202 and the rotation brackets 302a and 302b pivot, the detent brackets 304a and 304b interlock with the rotation brackets 302a and 302b, rotating the gears 372 formed in the detent brackets 304a and 304b. The first members 308a of the slide members 329a and 329b slide along the guide holes 321b of the rotation brackets 302a and 302b, and may guide the housings 201 and 202 to maintain a substantially constant path. The second members 308b of the slide members 329a and 329b may guide the sliding movement of the slide poles 376 coupled with the detent brackets 304a and 304b. Accordingly, the slide members 329a and 329b do not pivot on the detent brackets 304a and 304b but engage them to slidably move, thereby delivering the external force applied to the first housing 201 and/or the second housing 202 to the gears 372 and thus rotating them without substantial loss.

According to an embodiment, the hinge brackets may include a first hinge bracket 301a and a second hinge bracket 301b. The first hinge bracket 301a may be located on the multi-bar assembly (e.g., the multi-bar assembly 206 of FIG. 3) of the electronic device 200, and the second hinge bracket 301b may be located on the multi-bar assembly 206 in a position spaced apart from the first hinge bracket 301a. For example, at least one of the first hinge bracket 301a and the second hinge bracket 301b may provide a means for positioning the hinge module 204 on the multi-bar assembly 206. The structure of the first hinge bracket 301a is described below with reference to FIG. 9.

Figure 9:
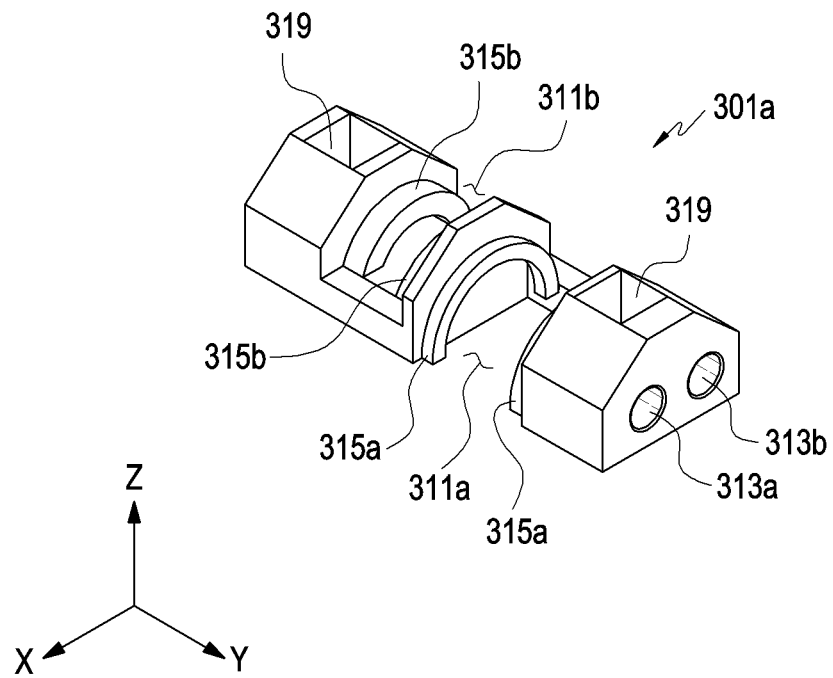
FIG. 9 is a perspective view illustrating an example first hinge bracket of an electronic device and/or a hinge module according to various embodiments.

FIG. 9 is a perspective view illustrating a first hinge bracket of an electronic device 200 (e.g., the electronic device 200 of FIGS. 3, 4 and 5) and/or a hinge module (e.g., the hinge module 204 of FIG. 6) according to various embodiments.

Referring to FIG. 9, the first hinge bracket 301a may provide a first rotation space 311a and a second rotation space 311b separated from each other. The first rotation space 311a may refer to a space in which the first rotation bracket 302a is rotatably received or positioned, and the second rotation space 311b may refer to a space in which the second rotation bracket 302b is rotatably received or positioned. At least one first rotation rail 315a extending to form a curved trajectory may be provided on the inner wall of the first rotation space 311a. In the illustrated embodiment, a pair of first rotation rails 315a may protrude from the inner wall of the first rotation space 311a in a length direction, e.g., in the −Y direction and/or +Y direction. When projected and viewed along the Y-axis direction, the pair of first rotation rails 315a may be aligned with each other. According to an embodiment, when projected and viewed along the Y-axis direction, the pair of first rotation rails 315a may have different radii of curvature which are co-centered. The second rotation space 311b may be positioned in the −Y direction with respect to the first rotation space 311a on the first hinge bracket 301a. At least one second rotation rail 315b extending to form a curved trajectory may be provided on the inner wall of the second rotation space 311b. In the illustrated embodiment, a pair of second rotation rails 315b may protrude from the inner wall of the second rotation space 311b in a length direction, e.g., in the −Y direction and/or +Y direction. When projected and viewed along the Y-axis direction, the pair of second rotation rails 315b may be aligned with each other. According to an embodiment, when projected and viewed along the Y-axis direction, the pair of second rotation rails 315b may have different radii of curvature which are co-centered.

According to an embodiment, the center of the curved trajectory formed by the first rotation rail 315a and/or the second rotation rail 315b, e.g., the center of the radius of curvature, may be located on the first pivot axis P1 and second pivot axis P2 of FIG. 3. For example, the positions of the first and second pivot axes P1 and P2 may be determined by the curved trajectory of the first rotation rail 315a and/or the second rotation rail 315b and the center of the radii of curvature of the first rotation rail 315a and/or the second rotation rail 315b. According to an embodiment, when projected and viewed along the Y-axis direction, if the center of the radius of curvature of the first rotation rail 315a is aligned with the center of the radius of curvature of the second rotation rail 315b, the first pivot axis P1 and the second pivot axis P2 may be identical. In an embodiment, when projected and viewed along the Y-axis direction, if the positions of the center of the radius of curvature of the first rotation rail 315a and the center of the radius of curvature of the second rotation rail 315b are different from each other, the plurality of pivot axes may be formed in positions spaced apart from each other.

According to an embodiment, the first hinge bracket 301a may include a first shaft hole 313a and a second shaft hole 313b. For example, the first shaft hole 313a and the second shaft hole 313b may be formed parallel to each other on an end surface of the first hinge bracket 301a facing the Y direction.

According to an embodiment, the first hinge bracket 301a may include fastening holes 319 formed on a top surface, e.g., a surface facing in the +Z direction. The fastening holes 319 may include, e.g., a thread formed on the inner wall, and may provide a means for placing the first hinge bracket 301*a* on the multi-bar assembly 206. According to an embodiment, the multi-bar assembly 206 may include a fastening boss corresponding to the fastening hole 319.

Referring back to FIGS. 6, 7 and 8, the second hinge bracket 301*b* may be disposed to face the first hinge bracket 301*a* in the Y direction, and may be positioned on the multi-bar assembly 206. For example, the second hinge bracket 301*b* may include a mounting or fixing means similar to the fastening hole 319 of the first hinge bracket 301*a*. According to an embodiment, the second hinge bracket 301*b* may include shaft holes similar to the first shaft hole 313*a* and/or the second shaft hole 313*b*. For example, in the Y direction, the shaft holes provided in the second hinge bracket 301*b* may be disposed to face any one of the first shaft hole 313*a* and the second shaft hole 313*b*. According to an embodiment, the first hinge bracket 301*a* and the second hinge bracket 301*b* may be positioned on the same one of the plurality of bars or rods included in the multi-bar assembly 206. According to an embodiment, the multi-bar assembly 206 may include an odd number of, e.g., 5 or 7, bars or rods, and the first hinge bracket 301*a* and the second hinge bracket 301*b* may be mounted on the bar or rod disposed in the middle in the X direction.

According to an embodiment, the rotation brackets may include a first rotation bracket 302*a* and a second rotation bracket 302*b*. The first rotation bracket 302*a* and/or the second rotation bracket 302*b* may include a slide frame 321*a* coupled with the first housing 201 and/or the second housing 202 and a rotation arm 323 extending from the slide frame 321*a*. The slide frame 321*a* may be located in the housing (e.g., the first housing 201 or the second housing 202 of FIG. 3). In the illustrated example embodiment, the first housing 201 and/or the second housing 202 are slidably coupled on the hinge module 204, and the slide frame 321*a* may be slidably coupled with the first housing 201 or the second housing 202. For example, the slide frame 321*a* may form a guide hole 321*b* extending in the X direction, and the first slide member 329*a* may be slidably received in the guide hole 321*b*. The first slide member 329*a* may be substantially positioned between the first housing 201, e.g., the first support plate 213 and/or the first slide plate 205*a* of FIG. 3, and the guide hole 321*b* may, for example, have a polygonal or closed curve shape, and the first slide member 329*a* may be constrained in a state in which the first slide member 329*a* is slidable within the guide hole 321*b*. According to an embodiment, the second slide member 329*b* may be slidably constrained in the guide hole 321*b* of the second rotation bracket 302*b* and may be positioned in the second housing 202. For example, the second slide member 329*b* may be located between the second support plate 223 and/or the second slide plate 205*b* of FIG. 3, and may slide in the guide hole 321*b* of the second rotation bracket 302*b*.

According to an embodiment, the rotation arm 323 of the first rotation bracket 302*a* and/or the second rotation bracket 302*b* may be rotatably coupled to the first hinge bracket 301*a*. For example, the rotation arm 323 of the first rotation bracket 302*a* may be rotatably received in the first rotation space 311*a*, and the rotation arm 323 of the second rotation bracket 302*b* may be rotatably received in the second rotation space 311*b*. While being coupled to the first hinge bracket 301*a*, the first rotation bracket 302*a* and the second rotation bracket 302*b* may be disposed on a straight line in the X direction. The rotation arms 323 of the rotation brackets 302*a* and 302*b* are described in greater detail below with reference to FIG. 10.

Figure 10:
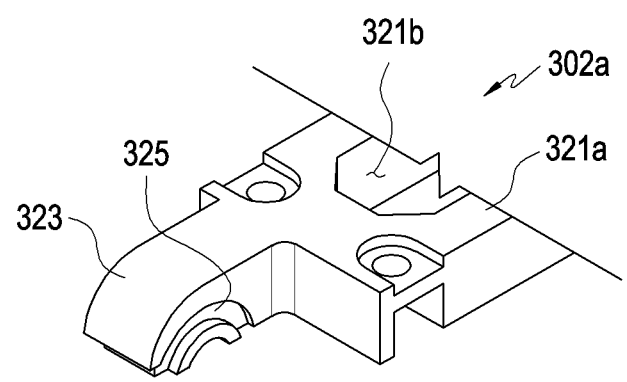
FIG. 10 is a perspective view illustrating a portion of an example first rotation bracket and/or a second rotation bracket of an electronic device and/or a hinge module according to various embodiments.

FIG. 10 is a perspective view illustrating a portion of a first rotation bracket 302*a* (e.g., the first rotation bracket 302*a* and/or the second rotation bracket 302*b* of FIG. 6) of an electronic device 200 (e.g., the electronic device 200 of FIGS. 3 to 5) and/or a hinge module (e.g., the hinge module 204 of FIG. 6) according to various embodiments.

Referring to FIG. 10 together with FIGS. 6, 7 and 8, the rotation arm 323 may include at least one rotation groove 325 that extends from an end of the slide frame 321*a* and is formed in a surface facing in the −Y direction and/or the +Y direction. The rotation groove 325 may have a shape and trajectory corresponding to the first rotation rail 315*a* and/or the second rotation rail 315*b*. According to an embodiment, the first rotation rail 315*a* and/or the second rotation rail 315*b* may be received in the rotation groove 325 to slide within the rotation groove 325. The first rotation bracket 302*a* and/or the second rotation bracket 302*b* may be coupled to the first hinge bracket 301*a* substantially by the rotation arm 323 and the first rotation rail 315*a* and/or the rotation arm 323 and the second rotation rail 315*b* and be guided by the rotation groove 325, the first rotation rail 315*a*, and/or the second rotation rail 315*b* to pivot on the first hinge bracket 301*a*.

Referring back to FIGS. 6, 7 and 8, the first rotation bracket 302*a* and the second rotation bracket 302*b* may be mounted on the first hinge bracket 301*a* to pivot. For example, the first rotation bracket 302*a* and the second rotation bracket 302*b* may be coupled to the first hinge bracket 301*a* to substantially form the first rotation part 204*a* of FIG. 5. According to an embodiment, the first rotation rail 315*a* and the second rotation rail 315*b* may have different centers of radii of curvature. For example, the pivot axis (e.g., the first pivot axis P1) of the first rotation bracket 302*a* and the pivot axis (e.g., the second pivot axis P2) of the second rotation bracket 302*b* may be spaced apart in parallel with each other. In an embodiment, the first rotation rail 315*a* and the second rotation rail 315*b* may have the same center of radii of curvature. For example, the pivot axes (e.g., the pivot axis P1 or P2) of the first rotation bracket 302*a* and the second rotation bracket 302*b* may be identical. When assembled in the first housing 201 and/or the second housing 202, the first rotation bracket 302*a* and the second rotation bracket 302*b* may be rotated on the first hinge bracket 301*a* in an angular range of about 90 degrees. According to an embodiment, the first rotation rail 315*a* and the second rotation rail 315*b* may have trajectories in an angular range exceeding 90 degrees, e.g., about 100 degrees. For example, when assembled in the first housing 201 and/or the second housing 202, the first rotation bracket 302*a* and the second rotation bracket 302*b* may pivot on the first hinge bracket 301*a* in a designated angular range (e.g., an angular range of about 90 degrees) while remaining engaged to the first hinge bracket 301*a*.

According to an embodiment, the hinge module 204 may include a detent hinge 308 and detent brackets 304*a* and 304*b* pivotably connected with the detent hinge 308. The detent hinge 308 may be positioned (e.g., mounted or fixed) on the multi-bar assembly (e.g., the multi-bar assembly 206 of FIG. 3) of the electronic device 200, and the detent brackets 304*a* and 304*b* may include a first detent bracket 304*a* and/or a second detent bracket 304*b*. The structure of the detent hinge 308 and the detent brackets 304*a* and 304*b* is described in greater detail below with further reference to FIGS. 11 and 12.

Figure 11:
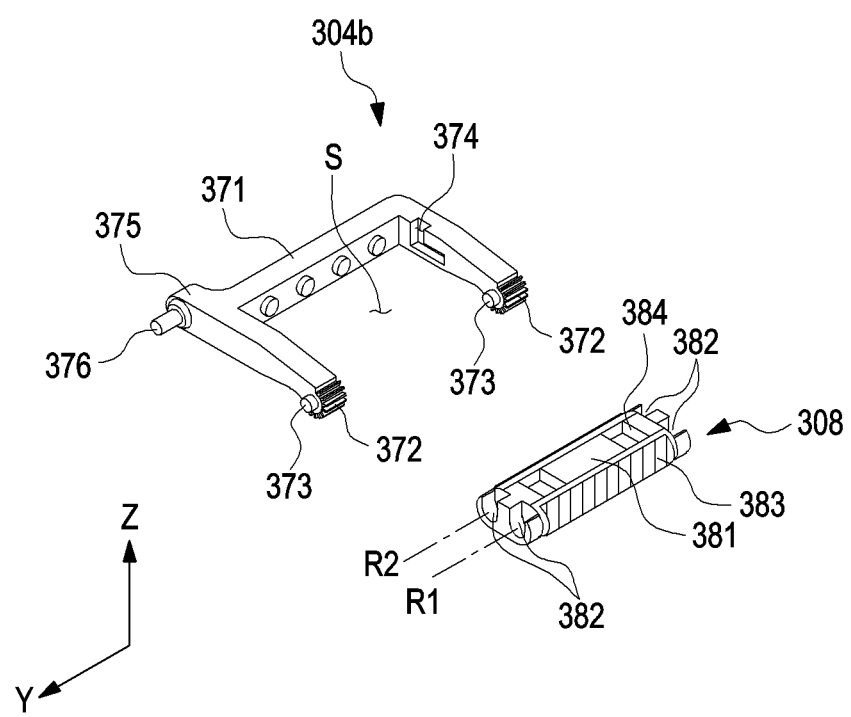
FIG. 11 is a perspective view illustrating an example detent hinge and a detent bracket of an electronic device and/or a hinge module according to various embodiments.
Figure 12:
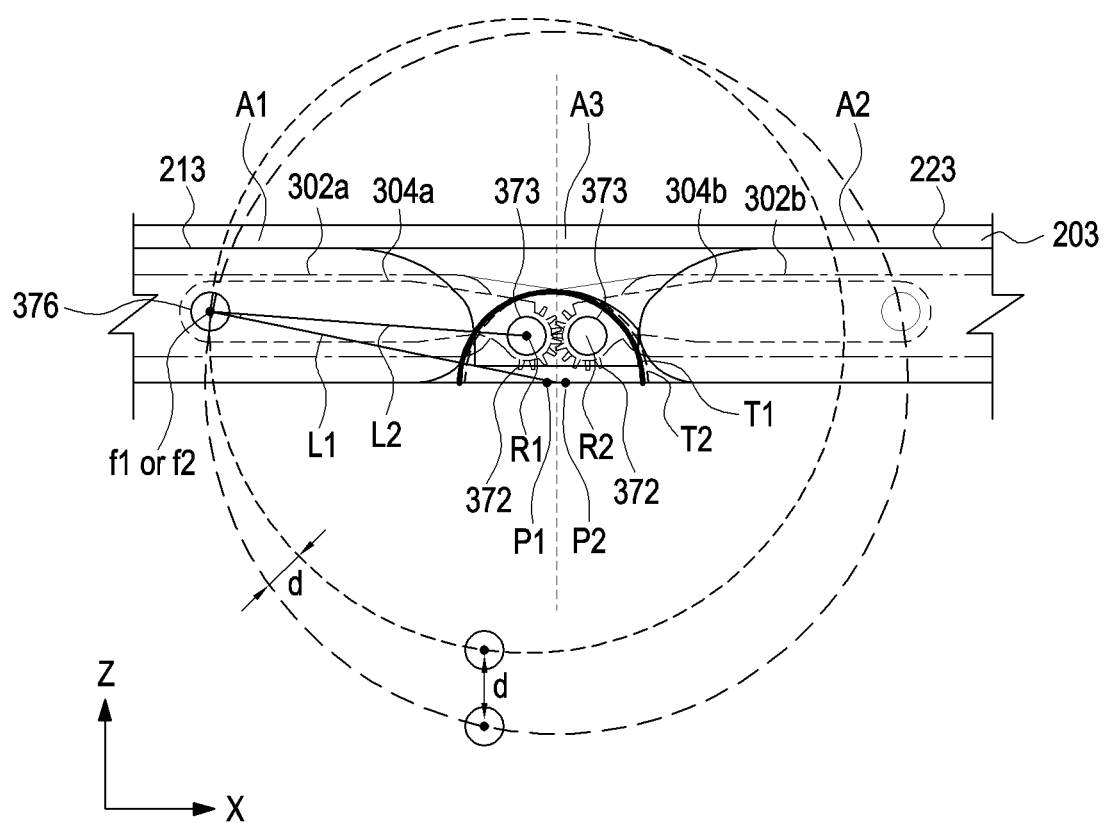
FIG. 12 is a diagram illustrating a positional relationship between a pivot axis and/or rotation axes of an electronic device and/or a hinge module according to various embodiments.

FIG. 11 is a perspective view illustrating an example detent hinge 308 and an example detent bracket (e.g., the second detent bracket 304*b*) of an electronic device (e.g., the electronic device 200 of FIGS. 3, 4 and 5) and/or a hinge module (e.g., the hinge module 204 of FIG. 6) according to various embodiments. FIG. 12 is a diagram illustrating a positional relationship between a pivot axis P1 or P2 and/or a rotation axis R1 or R2 of an electronic device (e.g., the electronic device 200 of FIGS. 3 to 5) and/or a hinge module (e.g., the hinge module 204 of FIG. 6) according to various embodiments.

Referring further to FIG. 11 along with FIGS. 6, 7 and 8, the detent hinge 308 may be mounted or fixed to a multi-bar assembly (e.g., multi-bar assembly 206 of FIG. 3), and the detent brackets 304a and 304b may be pivotably coupled to both sides of the detent hinge 308. For example, the detent hinge 308 may pivotably couple the second detent bracket 304b to the first detent bracket 304a. The first detent bracket 304a may be coupled to one side of the detent hinge 308 to pivot around the rotation axis R1, and the second detent bracket 304b may be coupled to the other side of the detent hinge 308 to pivot around the second rotation axis R2. For example, the first detent bracket 304a and the second detent bracket 304b which are in the unfolded position may be folded by pivoting in opposite directions with respect to each other. The first detent bracket 304a and the second detent bracket 304b which are in the folded position may pivot in opposite directions with respect to each other, unfolding to a designated angle.

According to an embodiment, the detent hinge 308 may include a hinge frame 381, receiving grooves 382 formed in both ends of the hinge frame 381, a cam surface formed in a cam shape along the outer surface of the hinge frame 381, and a fastening hole 384 for coupling with the multi-bar assembly 206. The hinge frame 381 overall may have a cylindrical shape and may have fastening holes 384 formed in the top surface (or bottom surface) of the hinge frame 381, e.g., a surface facing in the Z direction. The fastening holes 384 may include, e.g., a thread formed on the inner wall, and may provide a means for placing the hinge frame 381 on the multi-bar assembly 206. According to an embodiment, the multi-bar assembly 206 may include a fastening boss corresponding to the fastening hole 384.

According to an embodiment, the receiving groove 382 may be formed in an end surface of the hinge frame 381 to face in the length direction of the hinge frame, e.g., the Y direction. The receiving groove 382 may at least partially receive a pair of rotation shafts 373 of the detent brackets 304a and 304b arranged in parallel in the Y direction. For example, a pair of receiving grooves 382 are formed in both ends of the hinge frame 381 and may at least partially receive the first rotation shaft 373 of the first detent bracket 304a and the second rotation shaft 373 of the second detent bracket 304b. The cam surface 383 may be disposed in a direction perpendicular to the Y direction, which is the length direction of the hinge frame 381. According to an embodiment, the cam surfaces 383 may be formed on both side surfaces of the hinge frame 381 along the length direction of the hinge frame 381, and at least a portion thereof may include a curved surface for cam operation. The cam surface 383 may perform cam motion while in contact with the outer diameter of the roller 352, and as the area in contact with the roller 352 increases, a stable feeling of detent or torque may be provided.

According to an embodiment, the first detent bracket 304a and the second detent bracket 304b may be positioned to face each other with respect to the detent hinge 308. Hereinafter, the second detent bracket 304b is described, and the configuration of the second detent bracket 304b may be applied to the first detent bracket 304a.

According to an embodiment, the first detent bracket 304a and/or the second detent bracket 304b may include a bracket frame 371 with an open side, a rotation shaft 373 extending from an end surface of the bracket frame 371 to face in the Y direction, and a gear 372 positioned adjacent to the rotation shaft 373. According to an embodiment, the first detent bracket 304a and/or the second detent bracket 304b may further include a slide pole 376 that extends from the opposite side of the end surface of the bracket frame 371 to face in the Y direction and a guide recess 374 that is disposed inside the bracket frame 371 and guides movement of the detent assembly 305a or 305b.

According to an embodiment, the bracket frame 371 is a frame with an open side, and may have an opening in a direction adjacent to the detent hinge 308. For example, the bracket frame 371 may be shaped as '⊏' or '⊐.' As the detent hinge 308 is coupled to the open side, the bracket frame 371 may be shaped substantially as a rectangular closed loop. The detent assembly 305a or 305b may be positioned in the inner space S formed as the bracket frame 371 and the detent hinge 308.

According to an embodiment, the rotation shaft 373 may be disposed adjacent to the open side of the bracket frame 371 and protrude from the bracket frame 371 in the Y direction. A plurality of rotation shafts 373 may be disposed in different areas of the bracket frame 371, and may be spaced apart on the same line so as to be inserted into a plurality of receiving grooves 382 of the detent hinge 308. According to an embodiment, the gear 372 may include, e.g., a spur gear, formed to surround at least a portion of the rotation shaft 373. According to an embodiment, when the first detent bracket 304a and the second detent bracket 304b are coupled to both sides of the detent hinge 308, the spur gear of the first detent bracket 304a and the spur gear of the second detent bracket 304b may be engaged with each other. For example, when the rotation shaft 373 (e.g., rotation axis R1) of the first detent bracket 304a rotates in one direction (e.g., clockwise), the rotation shaft 373 (e.g., rotation axis R2) of the second detent bracket 304b may rotate in a reverse direction (e.g., counterclockwise).

According to an embodiment, the guide recess 374 may extend in the X direction on one surface facing the inner space S of the bracket frame 371, and may guide the sliding movement of the detent assembly 305a or 305b received in the inner space S of the bracket frame 371. For example, the guide recess 374 has a polygonal shape or a closed curve shape, and the holder 351a or 351b of the detent assembly 305a or 305b may be slidably constrained in the guide recess 374. According to an embodiment, when the first housing 201 and/or the second housing 202 is pivoted by an external force, the detent brackets 304a and 304b and the detent assemblies 305a and 305b coupled therewith may be pivoted on the detent hinge 308. When the detent assemblies 305a and 305b pivot, a variable elastic force (e.g., tensile or compressive force) may be provided by the elastic member 353. The guide recess 374 may guide the tension provided to the cam surface 383 by the roller 352 of the detent assembly 305a or 305b by the elastic force to be delivered horizontally.

According to an embodiment, the slide pole 376 may be formed to protrude on a hinge arm 375 protruding outward of the bracket frame 371. The slide pole 376 may be slidably received in the slide hole 327b formed in the second member 308b of the slide member 329a and 329b. The hinge arm 375 is formed to extend in the X direction which is opposite to the direction in which the guide recess 374 and/or the gear 372 of the bracket frame 371 is formed, and the slide pole 376 is formed to extend from the hinge arm 375 in the Y direction.

Referring further to FIG. 12 along with FIGS. 6, 7 and 8, it should be noted that the rectangular coordinate system mentioned in the description of the relative movement is based on the width direction (X axis) and/or the thickness direction (Z axis) of the first housing 201, e.g., the first support plate 213.

According to an embodiment, the first housing and the second housing (e.g., the first housing 201 and the second housing 202 in FIG. 3) are pivoted substantially about the pivot axis P1 or P2, and the detent bracket 304a or 304b may be slidably disposed on the first housing 201 or the second housing 202 and pivot around the rotation axis R1 or R2. According to an embodiment, when the first housing 201 and/or the second housing 202 pivots, a partial area, e.g., the folding area A3 of FIG. 12, of the flexible display 203 (e.g., the flexible display 103 of FIG. 1 or 2) may be transformed into a curved shape around the hinge module 204 (e.g., the second hinge bracket 301b). In FIG. 12, the first pivot axis P1 may be substantially the center of the radius of curvature of the trajectory T1 provided by the first rotation rail (e.g., the first rotation rail 315a of FIG. 9). The second pivot axis P2 may be substantially the center of the radius of curvature of the trajectory T2 provided by the second rotation rail (e.g., the first rotation rail 315b of FIG. 9). In an embodiment, the first housing 201 and the second housing 202 may be interlocked using the gears 372 engaged with each other. When the gears 372 have an appropriate size in this interlocking structure, they may have sufficient mechanical strength.

According to an embodiment, when the detent brackets 304a and 304b pivot together with the rotation shaft 373, the detent brackets 304a and 304b may remain substantially in parallel with the rotation brackets 302a and 302b and/or the support plates 213 and 223. For the detent bracket 304a or 304b to pivot while remaining substantially in parallel with the support plate 213 or 223, with the pivot axis P1 or P2 of the housing 201 or 202 misaligned with the rotation axis (e.g., the rotation axis R1 or R2) of the detent bracket 304a or 304b, the detent bracket 304a or 304b (e.g., the slide pole 376) may be interlocked with the rotation bracket 302a or 302b, and a variation in the interval between the detent bracket 304a or 304b and the support plate 213 or 223 may be received.

According to an embodiment, to identify the rotation radius of the detent brackets 304a and 304b and the rotation radius of the rotation brackets 302a and 302b, a straight line connecting the first pivot axis P1 of FIG. 12 and point f1 (e.g., point f1 of FIG. 8) of the slide pole 376 of the first detent bracket 304a may be set to L1, and a straight line connecting the rotation axis R1 and point f2 (e.g., point f2 of FIG. 8) (the area in parallel with the slide pole 376 in the Y direction) of the first rotation bracket 302a or 302b may be set to L2. For example, when the electronic device is in the unfolded position, points f1 and f2 may be set to coincide in the Y direction. While the electronic device is changed from the unfolded position to the folded position, the straight line L1 rotating about the first pivot axis P1 and the straight line L2 rotating about the rotation axis R1 have different paths, so that the distance d between point f1 and point f2 may gradually increase. According to an embodiment, to be consistent with the variation in distance between the detent bracket 304a or 304b and the support plate 213 or 223 when the housings 201 and 202 pivot or rotate, the slide pole 376 of the detent bracket 304a or 304b may slide in the slide groove 327b of the slide member 329a or 329b. The slide pole 376 may move substantially along a trajectory corresponding to a change in the distance between the detent bracket 304a or 304b and the support plate 213 or 223 in the slide groove 327b of the second member 308b. Accordingly, the detent bracket 304a or 304b may be pivoted while remaining parallel to the support plate 213 or 223.

According to an embodiment, the detent assembly 305a or 305b may be located in the inner space S created by the coupling of the detent hinge 308 and the detent bracket 304a or 304b, and may include a holder 351a or 351b, a roller 352, an elastic member 353, and a pin 354. The detent assemblies 305a and 305b are described in greater detail below with further reference to FIGS. 13, 14 and 15.

Figure 13:
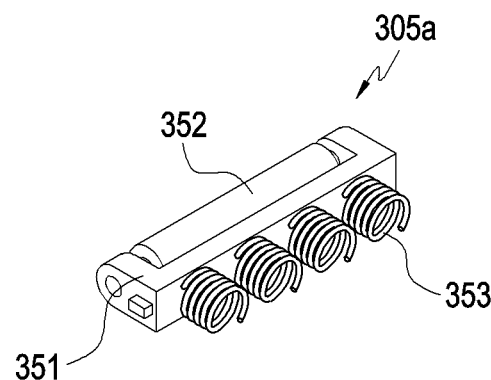
FIG. 13 is a perspective view illustrating an example assembled detent assembly of an electronic device and/or a hinge module according to various embodiments.
Figure 14:
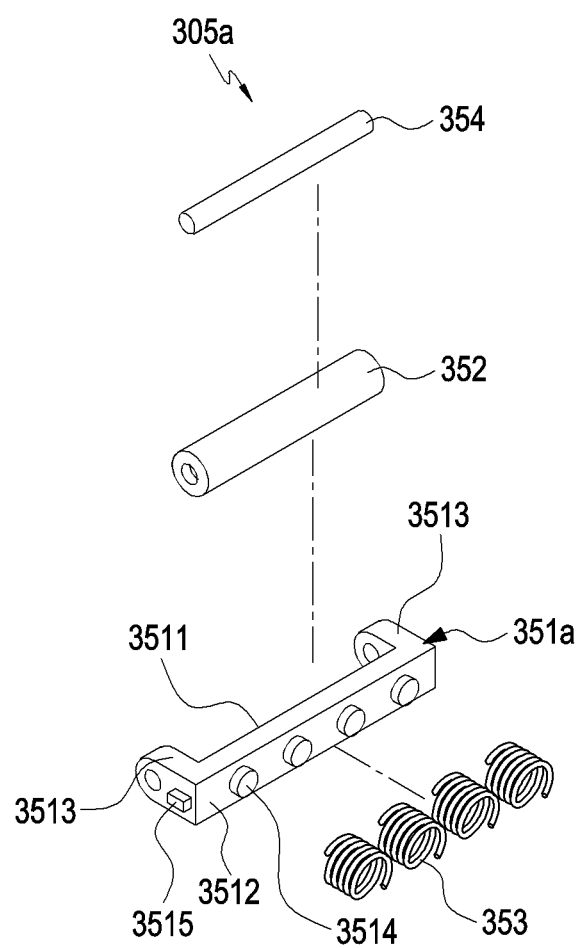
FIG. 14 is an exploded perspective view illustrating an example detent assembly of an electronic device and/or a hinge module according to an embodiment.

FIG. 13 is a perspective view illustrating an assembled detent assembly 305a or 305b of an electronic device (e.g., the electronic device 200 of FIGS. 3 to 5) and/or a hinge module (e.g., the hinge module 204 of FIG. 6) according to various embodiments. FIG. 14 is an exploded perspective view illustrating a detent assembly 305a or 305b of an electronic device (e.g., the electronic device 200 of FIGS. 3 to 5) and/or a hinge module (e.g., the hinge module 204 of FIG. 6) according to various embodiments.

Figure 15:
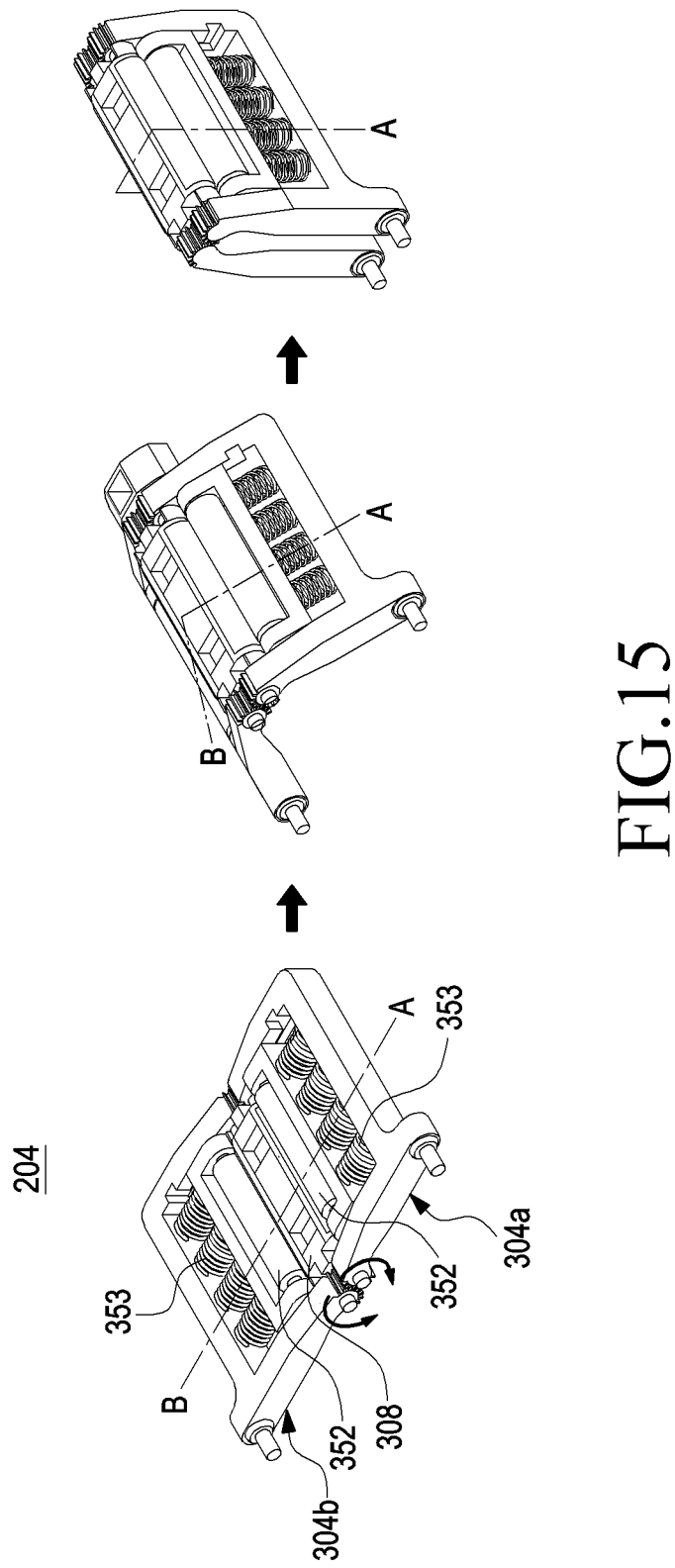
FIG. 15 is a perspective view illustrating an example operation in which an unfolded hinge module folds according to various embodiments.
Figure 16:
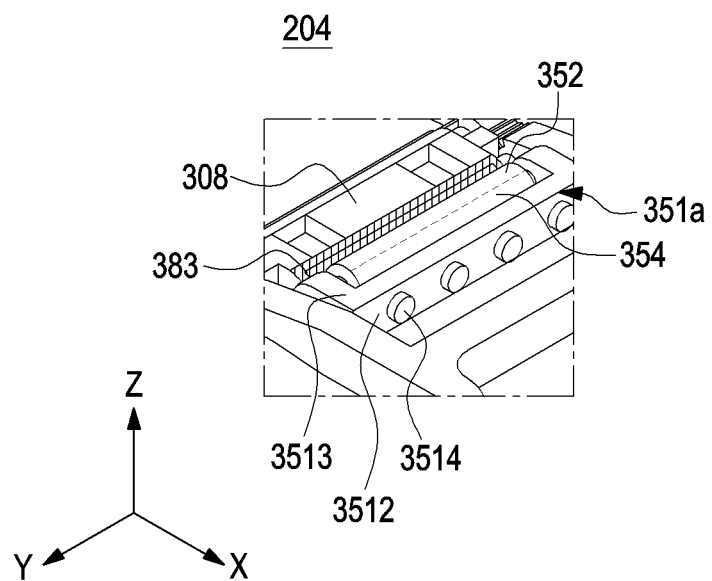
FIG. 16 is a projection view illustrating an example coupled relationship between a detent hinge and a detent assembly according to various embodiments.
Figure 17:
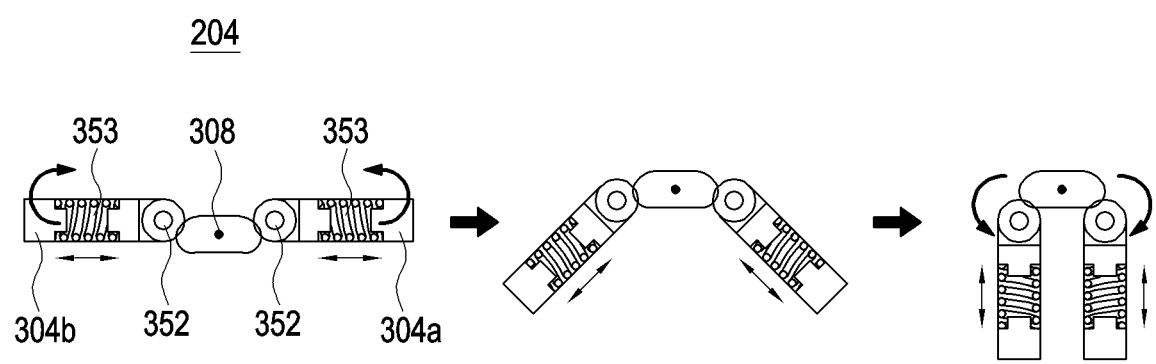
FIG. 17 is a cross-sectional view taken along line 'B-A' of FIG. 15 according to various embodiments.
Figure 18:
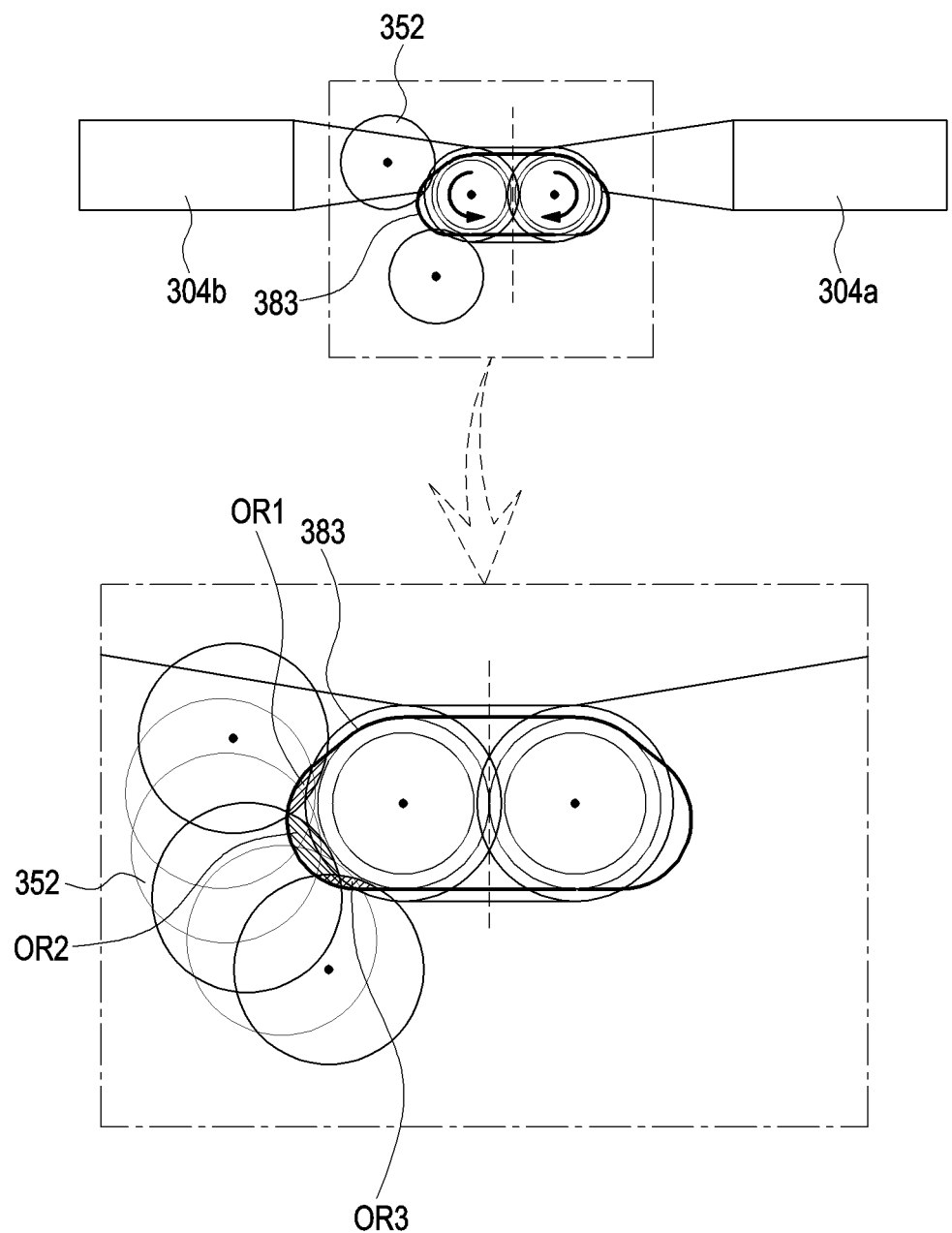
FIG. 18 is a diagram illustrating an example roller rolling along a cam surface of a hinge module according to various embodiments.

FIG. 15 is a perspective view illustrating an example operation in which an unfolded hinge module (e.g., the hinge module 204 of FIG. 6) folds according to various embodiments. FIG. 16 is a projection view illustrating a coupled relationship between a detent hinge 308 and detent assemblies 305a and 305b according to various embodiments. FIG. 17 is a cross-sectional view of the hinge module 204, taken along line 'B-A' of FIG. 15 according to various embodiments. FIG. 18 is a diagram illustrating a roller (e.g., the roller 354 of FIG. 16) rotating along a cam surface (e.g., the cam surface 383 of FIG. 16) of a hinge module (e.g., the hinge module 204 of FIG. 6) according to various embodiments.

Referring further to FIGS. 13 and 14 along with FIGS. 6, 7 and 8, the detent assemblies 305a and 305b may be received in the inner spaces S formed by the detent brackets 304a and 304b, pivoting as the detent brackets 304a and 304b pivot. The detent assemblies 305a and 305b may include a first detent assembly 305a or 305b and a second detent assembly 305a or 305b. According to an embodiment, the first detent assembly 305a or 305b and the second detent assembly 305a or 305b may be positioned to face each other with respect to the detent hinge 308. For example, the first detent assembly 305a (e.g., the first holder 351a, the roller 352, the elastic member (e.g., including an elastic material or a material configured to provide elastic force, such as, for example tensile or compressive force) 353, and the pin 354) coupled with the first detent bracket 304a may be pivoted around the first rotation axis R1, and the second detent assembly 305b (e.g., the second holder 351b, the roller 352, the elastic member 353, and the pin 354) coupled with the second detent bracket 304b may be pivoted around the second rotation axis R2.

According to an embodiment, the holders 351a and 351b may include a first holder 351a coupled with the first detent bracket 304a and a second holder 351b coupled with the second detent bracket 304b. The holders 351a and 351b may receive the rollers 352 and support the elastic members 353. For example, the holders 351a and 351b may include a first portion 3511 facing the detent hinge 308 and a second portion 3512 opposite to the first portion 3511, and the first portion 3511 may include arms 3513 protruding toward the detent hinge 308 so that the roller 352 may be received. The first portion 3511 may be shaped as '⊏' or '⊐.' The arms 3513 may include holes into which an end of the pin 354 forming a central axis of the roller 352 is inserted. The roller 352 received in the first portion 3511 may rotate around the pin 354.

According to an embodiment, the second portion 3512 may include a plurality of protrusions 3514 facing away from the detent hinge 308 so as to support the plurality of elastic members 353. The elastic member 353 may be shaped as a coil spring, and the protrusion 3514 may be inserted into the coil spring to reduce the ability of the coil spring from escaping off between the detent bracket 304a or 304b and the holder 351a or 351b. According to an embodiment, one side of the coil spring may be supported by the protrusion 3514, and the other side may be supported by a protrusion (not shown) formed inside the detent bracket 304a or 304b. However, various design changes may be made to the shape and supporting structure of the elastic member.

According to an embodiment, the holder 351a or 351b may include moving members 3515 on two opposite ends, e.g., on the opposite surface of the roller 352 in the first portion 3511. The moving member 3515 may include a protrusion that is slidably constrained in the guide recess 374 of the detent bracket 304a or 304b.

According to an embodiment, the roller 352 may include a hole capable of receiving the pin 354 and may be provided in a shape including a curved surface. For example, the curved surface may have a shape corresponding to the cam surface 383 of the detent hinge 308. As another example, the outer surface of the roller 352 may have a cylindrical shape or a polygonal shape including a curved surface.

Referring to FIGS. 15, 16, 17 and 18, when the first housing 201 and/or the second housing 202 gradually pivots from the unfolded position to the folded position, the detent bracket 304a or 304b coupled to interlock with the first housing 201 and/or the second housing 202 may be rotated around the rotation axis R1 or R2 by rotation of the gears 372. The gears of the detent brackets 304a and 304b rotate together, and the rollers 352 of the detent assemblies 305a and 305b may rotate along the cam surface 383 of the detent hinge 308 and slidingly contact.

According to an embodiment, the roller 352 may be mounted in the holder 351a or 351b to rotate about the central axis of the pin 354. For example, the outer surface of the roller 352 may rotate while being in sliding contact with the cam surface 383. The roller 352 may extend along the length direction of the detent hinge 308, e.g., the Y direction, so that it may rotate in contact with substantially the entire cam surface 383. For example, the roller 352 may have any one of a curved structure that is not circular, a curved surface having a plurality of curvatures, or a polygonal structure. The outer surface of the roller 352 may generate frictional force while rotating along the cam surface 383. The frictional force generated by the outer surface of the roller 352 and the cam surface 383 may be weighted by the elastic force of the elastic member 353 pressing the outer surface of the roller 352 to the cam surface 383. By the elastic force, at least a portion of the roller 352 may remain in the shape overlapping the cam surface (e.g., a first overlapping structure OR1, a second overlapping structure OR2, or a third overlapping structure OR3) while rotating.

According to an embodiment, as the detent hinge 308 and the detent assemblies 305a and 305b interlock, the first housing 201 and/or the second housing 202 may be rendered stationary in any angular position and, when a designated strength of, or higher, external force is applied, the first housing 201 and/or the second housing 202 may be allowed to pivot. According to an embodiment, when the first housing 201 and/or the second housing 202 is gradually pivoted from the unfolded position to the folded position (or when the first housing 201 and/or the first housing 201 is gradually pivoted from the folded position to the unfolded position), the overlapping degree of the overlapped shape continuously increases and then decreases, thereby providing the user with a feeling of folding or unfolding of the electronic device.

According to an embodiment, in the unfolded position of the detent brackets 304a and 304b with respect to the detent hinge 308, the first overlapping structure OR1 between the roller 352 and the cam surface 383 may strongly maintain the unfolded position (e.g., maintaining the force of unfolding at 180 degrees or more), and provide the user with a detent feeling (e.g., a feeling of operation or haptic feedback) by which the user may identify that the operation is done. According to an embodiment, in an intermediate position between the unfolded position and the folded position of the detent brackets 304a and 304b with respect to the detent hinge 308, the second overlapping structure OR2 between the roller 352 and the cam surface 383 may maintain the intermediate position as the overlapping degree continuously decreases or increases and provide the user with a detent feeling (e.g., a feeling of operation or haptic feedback). According to an embodiment, in the folded position of the detent brackets 304a and 304b with respect to the detent hinge 308, the third overlapping structure OR3 between the roller 352 and the cam surface 383 may strongly maintain the folded position and provide the user with a detent feeling (e.g., a feeling of operation or haptic feedback) by which the user may identify that the operation is done. According to an embodiment, the cams (e.g., a reference cam and a rotation cam) in the hinge module are arranged along the Y direction, and the contact area between the cams for rotation may be made in the Y direction. Accordingly, as the electronic device and/or the hinge module becomes slimmer, the contact area forming a radius around the Y-axis decreases, and lifespan and torque may decrease. According to the illustrated embodiment, in the hinge module 204, the detent hinge 308 and the roller 352 are arranged to contact each other in the X direction perpendicular to the Y direction, and the cam surface 383 of the detent hinge 308 corresponding to the reference cam and the outer surface of the roller 352 corresponding to the rotation cam are positioned to contact in the direction perpendicular to the Y direction, increasing the contact area without influence by slimming down the electronic device and/or the hinge module. The hinge module 204 according to the disclosure may have enhanced lifespan and torque even in a slimmer electronic device or hinge module.

According to an embodiment, the elastic member 353 may be disposed such that a free field is set in a direction perpendicular to the Y direction. A plurality of elastic members (e.g. a spring or arrangement that provides resilient tensile resistance or force or compressive force) 353 may be arranged, and the plurality of elastic members 353 may be arranged along the length direction (Y direction) of the roller 352 and/or the cam surface 383. The plurality of elastic members 353 may be arranged in parallel by the length direction of the roller 352 or more so that the outer surface of the roller 352 may transmit the elastic force to substantially the overall cam surface 383. An embodiment of the disclosure may enhance the torque by increasing the number of elastic members 353 even without increasing the length of the free field of the elastic member 353 in the Y direction.

According to an embodiment, the roller 352 may include an injected material having a lower strength than metal. For example, the roller 352 may be formed of at least one of PEEK, PC, PVC, PTFE, POM, PE, or PP. As another example, the inside of the roller 352 may be formed of an injected material and/or a metal material, and the outside (e.g., the surface) may be formed of an elastic material. The elastic material may include at least one of rubber, urethane, and silicone. The roller 352 formed of an injected material has a lower specific gravity than that of metal and thus lightweight, and when rotating in contact with the cam surface 383, it may implement a smooth feeling of operation.

Figure 19:
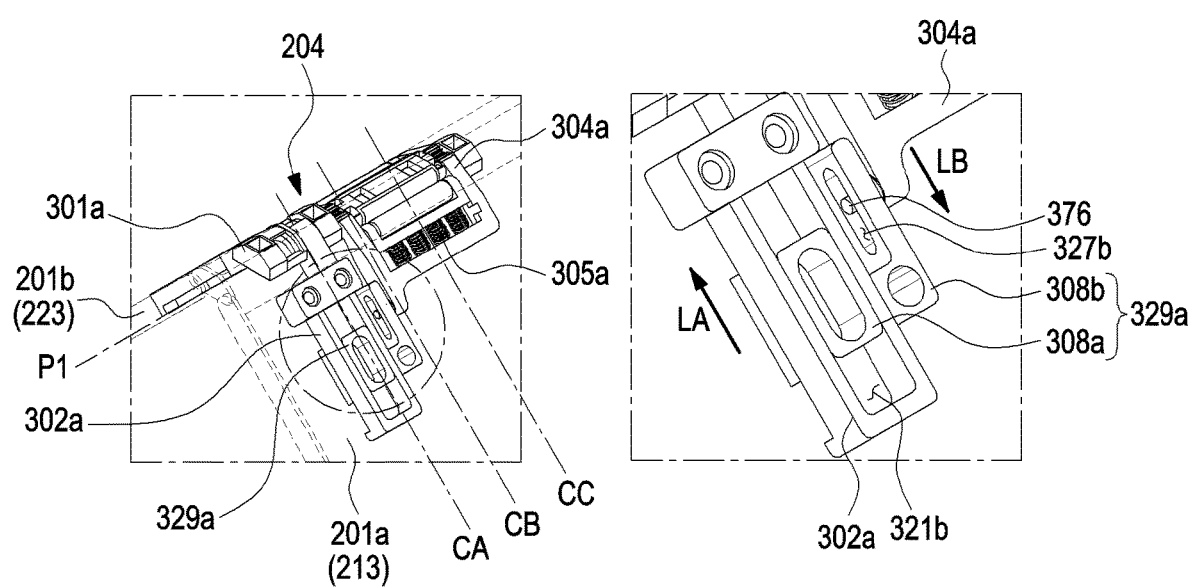
FIG. 19 is a perspective view illustrating an example operation in which an electronic device and/or a hinge module folds according to various embodiments.
Figure 20:
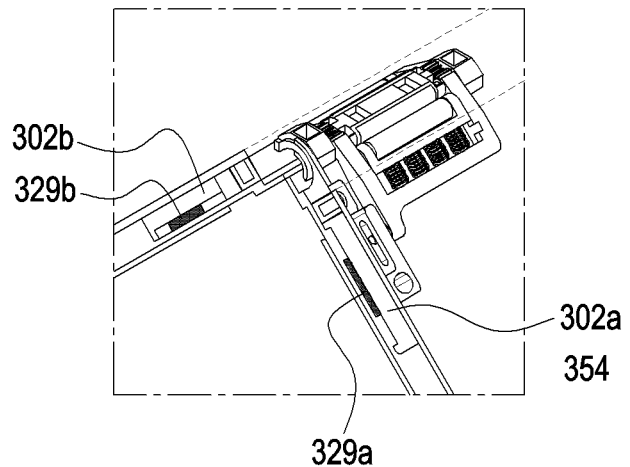
FIG. 20 is a perspective view illustrating a hinge module taken along line 'CA' of FIG. 19, in an operation in which an electronic device and/or a hinge module folds according to various embodiments.
Figure 21:
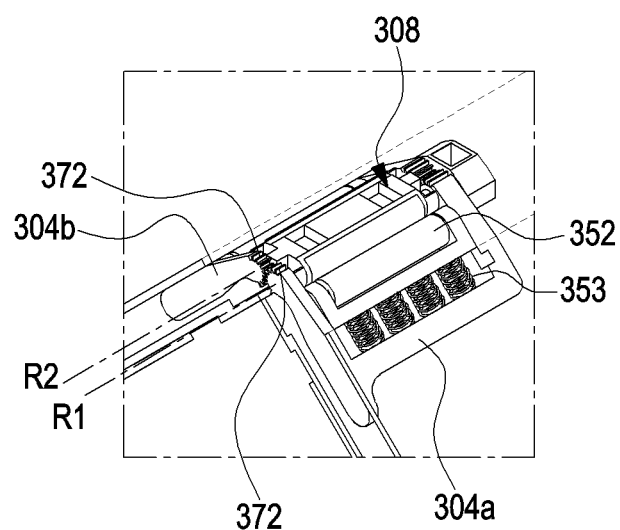
FIG. 21 is a perspective view illustrating a hinge module taken along line 'CB' of FIG. 19, in an operation in which an electronic device and/or a hinge module folds according to various embodiments.
Figure 22:
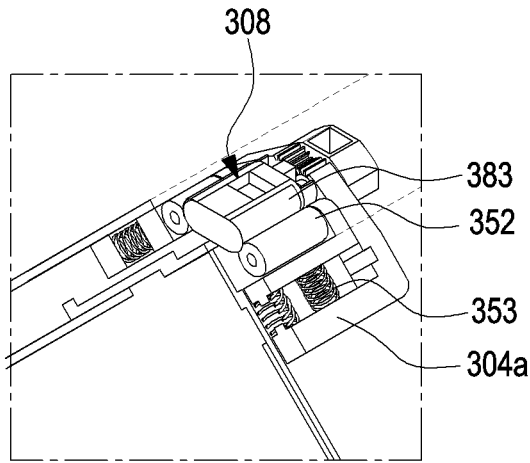
FIG. 22 is a perspective view illustrating a hinge module taken along line 'CC' of FIG. 19, in an operation in which an electronic device and/or a hinge module folds according to various embodiments.

FIG. 19 is a perspective view illustrating an example operation in which an electronic device (e.g., the electronic device 200 of FIGS. 3, 4 and 5) and/or a hinge module (e.g., the hinge module 204 of FIG. 6) folds according to various embodiments. FIG. 20 is a perspective view illustrating a hinge module 204 taken along line 'CA' of FIG. 19 in an operation in which an electronic device (e.g., the electronic device 200 of FIGS. 3, 4 and 5) and/or a hinge module (e.g., the hinge module 204 of FIG. 6) folds according to various embodiments. FIG. 21 is a perspective view illustrating a hinge module 204 taken along line 'CB' of FIG. 19 in an operation in which an electronic device (e.g., the electronic device 200 of FIGS. 3, 4 and 5) and/or a hinge module (e.g., the hinge module 204 of FIG. 6) folds according to various embodiments. FIG. 22 is a perspective view illustrating a hinge module 204 taken along line 'CC' of FIG. 19 in an operation in which an electronic device (e.g., the electronic device 200 of FIGS. 3, 4 and 5) and/or a hinge module (e.g., the hinge module 204 of FIG. 6) folds according to various embodiments.

Referring to FIGS. 19, 20, 21 and 22 together with FIGS. 1 and 7, when the first housing 201 and/or the second housing 202 gradually pivot from the unfolded position to the folded position, the first housing 201 and/or the second housing 202 may slide in a direction closer to the hinge module 204, e.g., the pivot axis P1 or P2. According to an embodiment, when the first housing 201 and/or the second housing 202 pivots, the slide members 329a and 329b may slide on the rotation brackets 302a, 302b while guiding the sliding movement of the first housing 201 and/or the second housing 202. The slide members 329a and 329b may move substantially linearly on the rotation brackets 302a and 302b. As the slide members 329a and 329b are coupled to the first housing 201 and/or the second housing 202, respectively, if the first housing 201 and/or the second housing 202 gradually pivots from the unfolded position to the folded position, it may slide in a direction closer to the hinge module 204.

According to an embodiment, the electronic device 200 may have different rear surface lengths (e.g., the length measured in the X direction of FIG. 1) in the unfolded position and folded position of the electronic device 200. As the slide members 329a and 329b slide on the rotation brackets 302a and 302b, a change in length may be implemented on the rear surface of the electronic device 200. According to an embodiment, as the length changes on the rear surface of the electronic device 200, the exposure to the outside of a partial area, e.g., the area indicated with 'V1' and/or 'V2,' of the rear surface of the electronic device 200 may be decreased or increased.

According to an embodiment, when the first housing 201 and/or the second housing 202 pivots, the direction of the linear movement on the slide members 329a and 329b of the slide poles 376 may be opposite to the direction of the linear movement on the rotation brackets 302a and 302b of the slide members 329a and 329b. For example, when the first housing 201 and/or the second housing 202 gradually pivots from the unfolded position to the folded position, the direction in which the first member 308a of the first slide member 329a moves in the guide hole 321b of the first rotation bracket 302a or 302b may be direction LA direction toward the pivot axis P1 or P2. In this case, the direction in which the slide pole 376 of the first detent bracket 304a moves in the slide groove 327b of the first slide member 329a may be direction LB which is opposite to direction LA.

According to an embodiment, when the first housing 201 and/or the second housing 202 pivots, the slide pole 376 may slide within the slide groove 327b of the slide member 329a or 329b. When the pivot axis (e.g., the rotation axis R1 or R2 of FIG. 12) of the detent bracket 304a or 304b is not consistent with the pivot axis (e.g., the pivot axis P1 or P2 of FIG. 12) of the first housing 201 and/or the second housing 202, the slide poles 376 of the detent brackets 304a and 304b may move closer or farther away from the hinge bracket (e.g., the first hinge bracket 301a) while the first housing 201 and/or the second housing 202 pivots, so that the slide poles 376 of the detent brackets 304a and 304b may remain parallel with the support plates 213 and 223.

According to an embodiment, when the first housing 201 and/or the second housing 202 pivots, a partial area, e.g., the folding area A3 of FIG. 3, of the flexible display 203 (e.g., the flexible display 103 of FIG. 1 or 2) may be transformed into a curved shape around the hinge module 204 (e.g., the second hinge bracket 301b). As described above, the length of the flexible display 203 does not substantially change in the transforming operation and, as the first housing 201 and/or the second housing 202 slides, it may be possible to prevent and/or reduce tension or compressive force from being exerted to the flexible display 203 in the X-axis direction.

According to an embodiment, as the electronic device 200 gradually transforms from the unfolded position to the folded position, the areas of the first housing 201, the second housing 202, the slide members 329a and 329b, and/or the detent brackets 304a and 304b adjacent to the hinge module 204 may be moved three-dimensionally in a direction in which they gradually approach the pivot axis P1 or P2 (or the rotation axis R1 or R2). While the first housing 201 and/or the second housing 202 pivots, the rotation bracket 302a or 302b is guided by the rotation rail (e.g., the rotation rail 315a or 315b of FIG. 9) to pivot around the pivot axis P1 or P2. While the first housing 201 and/or the second housing 202 pivots, the detent bracket 304a or 304b may rotate around the rotation axis R1 or R2 by the rotation of the gears 372. The slide pole 376 of the detent bracket 304a or 304b may move in the direction (e.g., direction LB) approaching the outer end of the slide member 329a or 329b while remaining parallel to the support plate (e.g., the support plate 213 or 223 in FIG. 3).

According to an embodiment, when the first housing 201 and/or the second housing 202 pivots, the gears 372 of the detent brackets 304a and 304b may be engaged with each other, so that any one rotates in one direction while the other may rotate in the opposite direction. According to an embodiment, when an external force is applied so that at least one of the first housing 201 and the second housing 202 pivots on the hinge module 204 in one direction, the other one of the first housing 201 and the second housing 202 may be pivoted in the opposite direction by the interlocking by the gears 372. For example, as an external force is applied, the first housing 201 and the second housing 202 may pivot in opposite directions with respect to each other, unfolding or folding.

According to an embodiment, when the first housing 201 and/or the second housing 202 pivots, the gears of the detent brackets 304a and 304b rotate together, and the rollers 352 of the detent assemblies 305a and 305b may rotate along the cam surface 383 of the detent hinge 308 and slidingly contact. The outer surface of the roller 352 may generate frictional force while rotating along the cam surface 383 which has a polygonal shape. The frictional force generated by the outer surface of the roller 352 and the cam surface 383 may be weighted by the elastic force of the elastic member 353 pressing the outer surface of the roller 352 to the cam surface 383. As the detent hinge 308 and the detent assemblies 305a and 305b interlock, the first housing 201 and/or the second housing 202 may be rendered stationary in any angular position and, when a designated strength of, or higher, external force is applied, the first housing 201 and/or the second housing 202 may be allowed to pivot.

Figure 23:
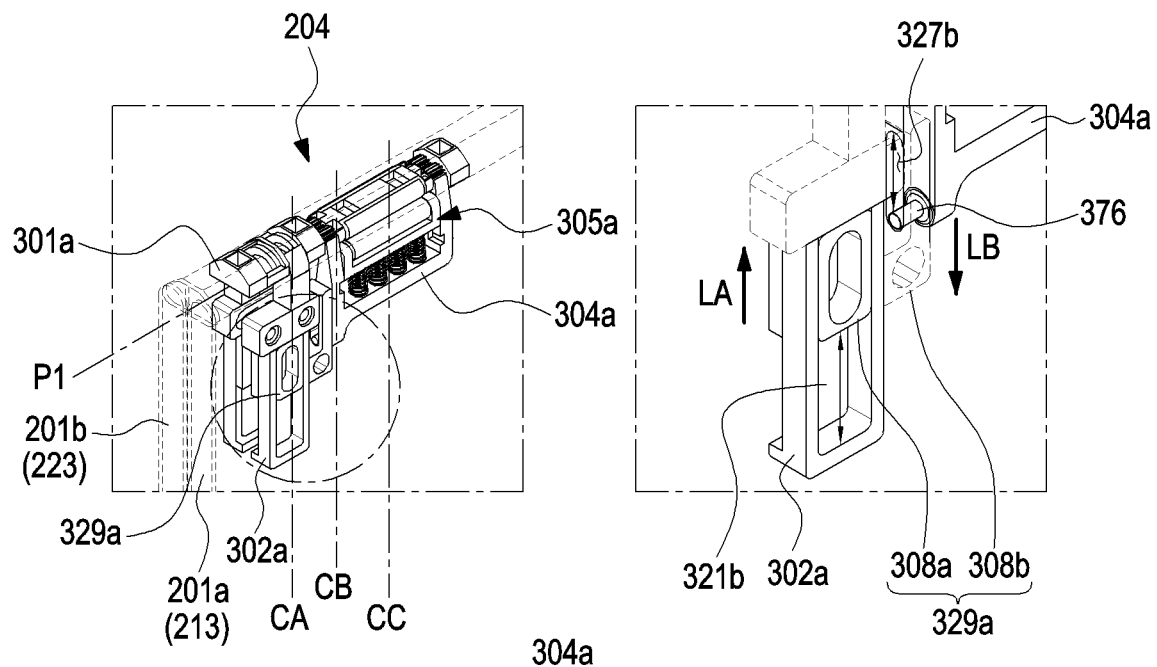
FIG. 23 is a perspective view illustrating a folded position of an electronic device and/or a hinge module according to various embodiments.
Figure 24:
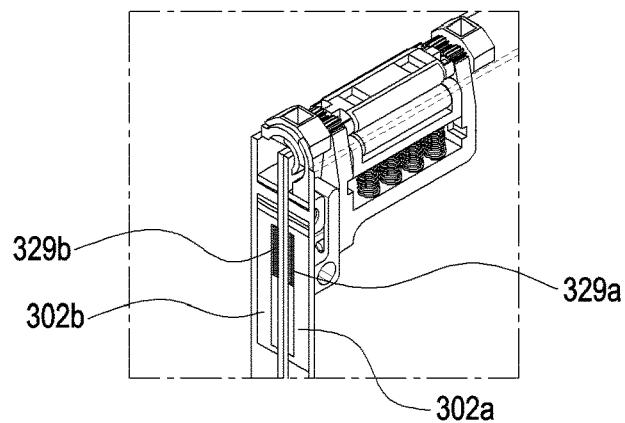
FIG. 24 is a perspective view illustrating a hinge module taken along line 'CA' of FIG. 23, in a folded position of an electronic device and/or the hinge module according to various embodiments.
Figure 25:
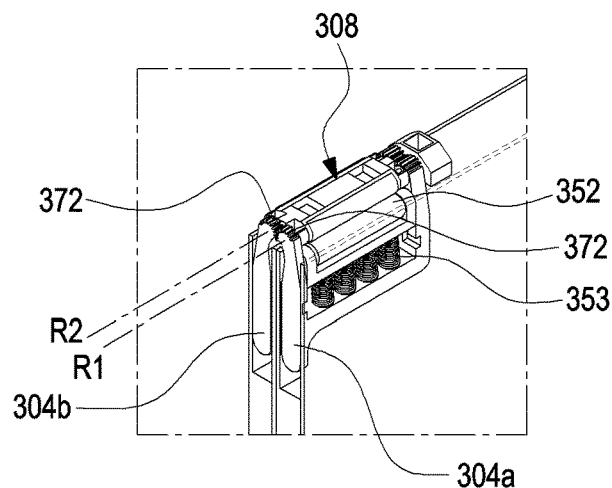
FIG. 25 is a perspective view illustrating a hinge module taken along line 'CB' of FIG. 23, in a folded position of an electronic device and/or the hinge module according to various embodiments.
Figure 26:
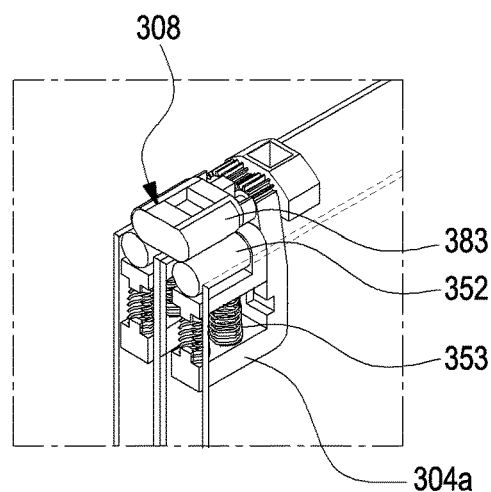
FIG. 26 is a perspective view illustrating a hinge module taken along line 'CC' of FIG. 23, in a folded position an electronic device and/or the hinge module according to various embodiments.

FIG. 23 is a perspective view illustrating a folded position of an electronic device (e.g., the electronic device 200 of FIGS. 3, 4 and 5) and/or a hinge module (e.g., the hinge module 204 of FIG. 6) folds according to various embodiments. FIG. 24 is a perspective view illustrating a hinge module 204 taken along line 'CA' of FIG. 23 in a folded position of an electronic device (e.g., the electronic device 200 of FIGS. 3, 4 and 5) and/or a hinge module (e.g., the hinge module 204 of FIG. 6) folds according to various embodiments. FIG. 25 is a perspective view illustrating a hinge module 204 taken along line 'CB' of FIG. 23 in a folded position of an electronic device (e.g., the electronic device 200 of FIGS. 3, 4 and 5) and/or a hinge module (e.g., the hinge module 204 of FIG. 6) folds according to various embodiments. FIG. 26 is a perspective view illustrating a hinge module 204 taken along line 'CC' of FIG. 23 in a folded position of an electronic device (e.g., the electronic device 200 of FIGS. 3, 4 and 5) and/or a hinge module (e.g., the hinge module 204 of FIG. 6) folds according to various embodiments.

Referring to FIGS. 1 and 7 together with FIGS. 23, 24, 25 and 26, the housings 201 and 202, the support plates 213 and 223, and/or the rotation brackets 302a and 302b in the folded position of the electronic device, as compared with the unfolded position of the electronic device, may move closer to the hinge module 204, e.g., the pivot axis P1 or P2 (rotation axis R1 or R2). According to an embodiment, in the folded position of the electronic device, the first housing 201 and/or the second housing 202 may face each other. According to an embodiment, as the slide members 329a and 329b move in combination with the housings 201 and 202, the sliding movement of the slide members 329a and 329b on the rotation brackets 302a and 302b in the folded position of the electronic device is complete and may thus be positioned closer to the pivot axis P1 or P2 as compared with the unfolded position of the electronic device.

According to an embodiment, when the first housing 201 and/or the second housing 202 pivots, the direction (e.g., direction LB) of the linear movement on the slide members 329a and 329b of the slide poles 376 may be opposite to the direction (e.g., direction LA) of the linear movement on the rotation brackets 302a and 302b of the slide members 329a and 329b. For example, in the folded position of the electronic device, the first member 308a of the first slide member 329a may be positioned in the area closest to the hinge module 204 within the guide hole 32b, and the slide pole 376 of the first detent bracket 304a may be positioned in the area farthest from the hinge module within the slide groove 327b.

According to an embodiment, in the folded position of the electronic device, the rotation of the roller 352 of the detent assembly 305a or 305b along the cam surface 383 of the detent hinge 308 may be complete, and the outer surface of the roller 352 of the first detent bracket 304a and the outer surface of the roller 352 of the second detent bracket 304b may be disposed to face each other. The frictional force generated by the outer surface of the roller 352 and the cam surface 383 may be weighted by the elastic force of the elastic member 353 pressing the outer surface of the roller 352 to the cam surface 383. By interlocking the detent hinge 308 and the detent assemblies 305a and 305b, the user may be provided with a detent feeling (e.g., a feeling of operation) to allow the user to identify that the operation has been done when the electronic device reaches the folded position.

Figure 27:
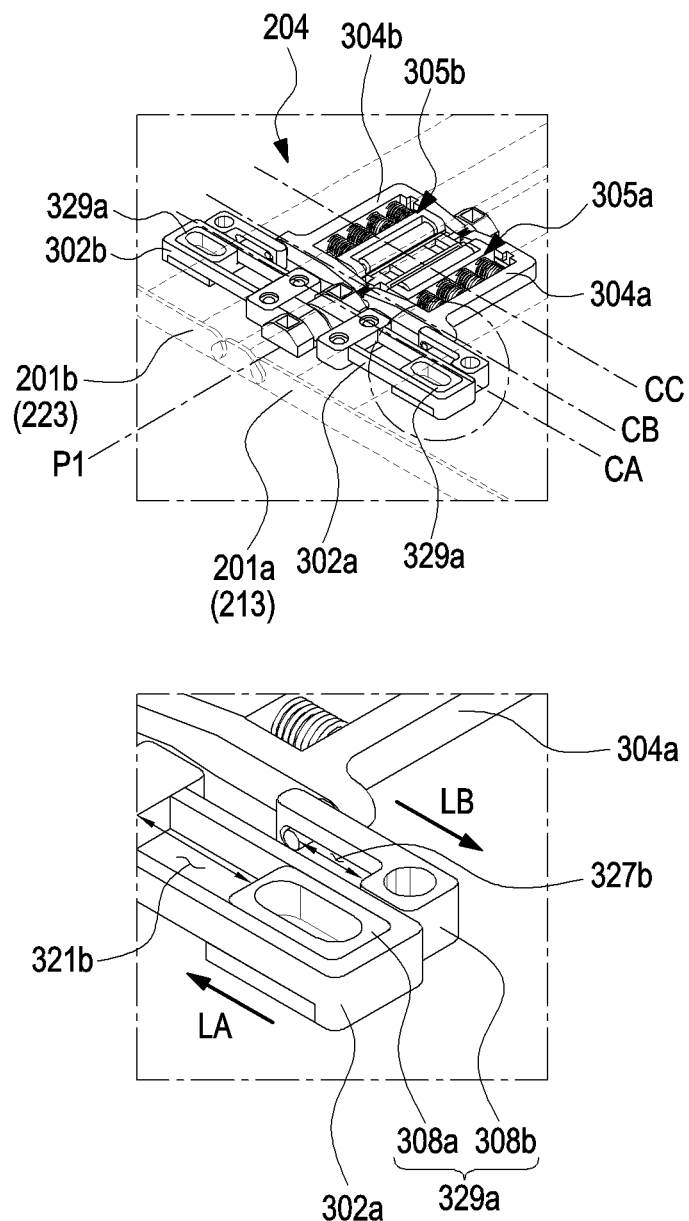
FIG. 27 is a perspective view illustrating an unfolded position of an electronic device and/or a hinge module according to various embodiments.
Figure 28:
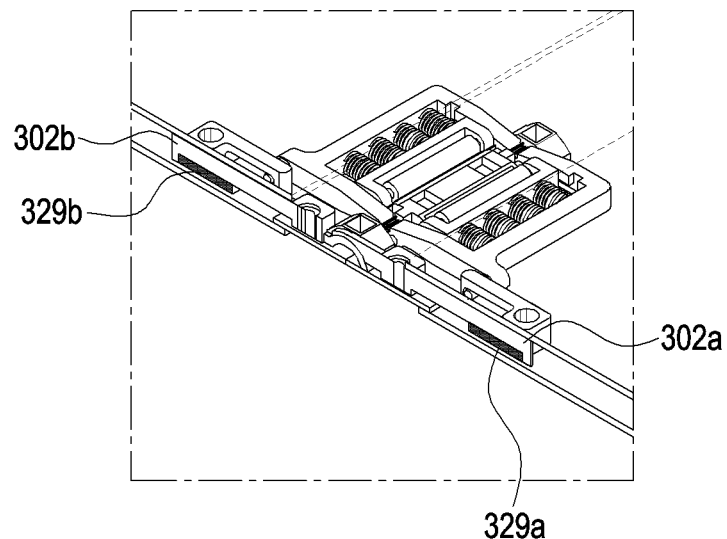
FIG. 28 is a perspective view illustrating a hinge module taken along line 'CA' of FIG. 27, in an unfolded position of an electronic device and/or the hinge module according to various embodiments.
Figure 29:
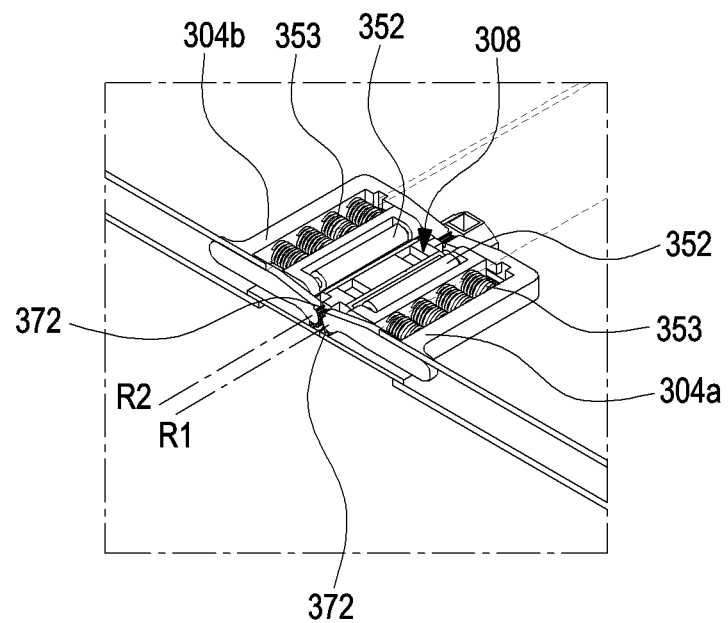
FIG. 29 is a perspective view illustrating a hinge module taken along line 'CB' of FIG. 27, in an unfolded position of an electronic device and/or the hinge module according to various embodiments.
Figure 30:
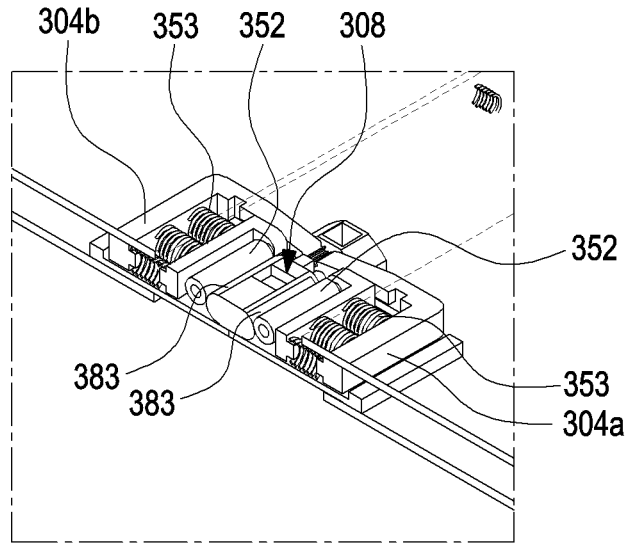
FIG. 30 is a perspective view illustrating a hinge module taken along line 'CC' of FIG. 27, in an unfolded position of an electronic device and/or the hinge module according to various embodiments.

FIG. 27 is a perspective view illustrating an unfolded position of an electronic device (e.g., the electronic device 200 of FIGS. 3, 4 and 5) and/or a hinge module (e.g., the hinge module 204 of FIG. 6) folds according to various embodiments. FIG. 28 is a perspective view illustrating a hinge module 204 taken along line 'CA' of FIG. 27 in an unfolded position of an electronic device (e.g., the electronic device 200 of FIGS. 3, 4 and 5) and/or a hinge module (e.g., the hinge module 204 of FIG. 6) folds according to various embodiments. FIG. 29 is a perspective view illustrating a hinge module 204 taken along line 'CB' of FIG. 27 in an unfolded position of an electronic device (e.g., the electronic device 200 of FIGS. 3, 4 and 5) and/or a hinge module (e.g., the hinge module 204 of FIG. 6) folds according to various embodiments. FIG. 30 is a perspective view illustrating a hinge module 204 taken along line 'CC' of FIG. 27 in an unfolded position of an electronic device (e.g., the electronic device 200 of FIGS. 3, 4 and 5) and/or a hinge module (e.g., the hinge module 204 of FIG. 6) folds according to various embodiments.

Referring to FIGS. 1 and 7 together with FIGS. 24, 25, 26 and 27, the housings 201 and 202, the support plates 213 and 223, and/or the rotation brackets 302a and 302b in the unfolded position of the electronic device, as compared with the folded position of the electronic device, may move farther away from the hinge module 204, e.g., the pivot axis P1 or P2 (rotation axis R1 or R2). According to an embodiment, in the unfolded position of the electronic device, the first housing 201 and/or the second housing 202 may be positioned in parallel with each other to face in the same direction. According to an embodiment, as the slide members 329a and 329b move in combination with the housings 201 and 202, the sliding movement of the slide members 329a and 329b on the rotation brackets 302a and 302b in the unfolded position of the electronic device is complete and may thus be positioned farther away from the pivot axis P1 or P2 as compared with the folded position of the electronic device.

According to an embodiment, when the first housing 201 and/or the second housing 202 pivots, the direction (e.g., direction LB) of the linear movement on the slide members 329a and 329b of the slide poles 376 may be opposite to the direction (e.g., direction LA) of the linear movement on the rotation brackets 302a and 302b of the slide members 329a and 329b. For example, in the unfolded position of the electronic device, the first member 308a of the first slide member 329a may be positioned in the area farthest from the hinge module 204 within the guide hole 321b, and the slide pole 376 of the first detent bracket 304a may be positioned in the area closest to the hinge module 204 within the slide groove 327b.

According to an embodiment, in the unfolded position of the electronic device, the rotation of the roller 352 of the detent assembly 305a or 305b along the cam surface 383 of the detent hinge 308 may be complete, and the roller 352 of the first detent bracket 304a and the roller 352 of the second detent bracket 304b may be positioned in parallel with each other, with the detent hinge 308 disposed therebetween. The frictional force generated by the outer surface of the roller 352 and the cam surface 383 may be weighted by the elastic force of the elastic member 353 pressing the outer surface of the roller 352 to the cam surface 383. By interlocking the detent hinge 308 and the detent assemblies 305a and 305b, the user may be provided with a detent feeling (e.g., a feeling of operation) to allow the user to identify that the operation has been done when the electronic device reaches the unfolded position.

Figure 31:
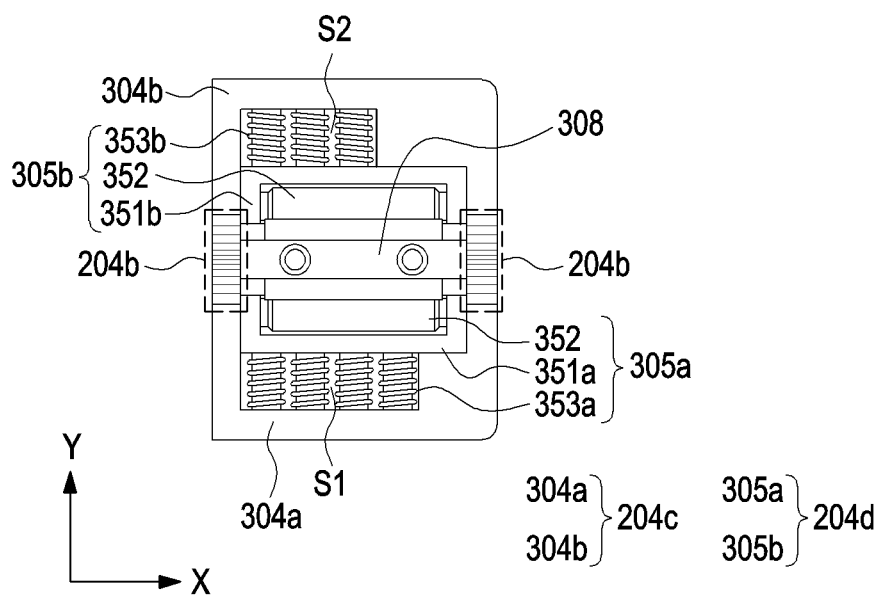
FIGS. 31 and 32 are diagrams illustrating an example interlocking part, a second rotation part, and a detent part of an electronic device and/or a hinge module according to various embodiments.
Figure 32:
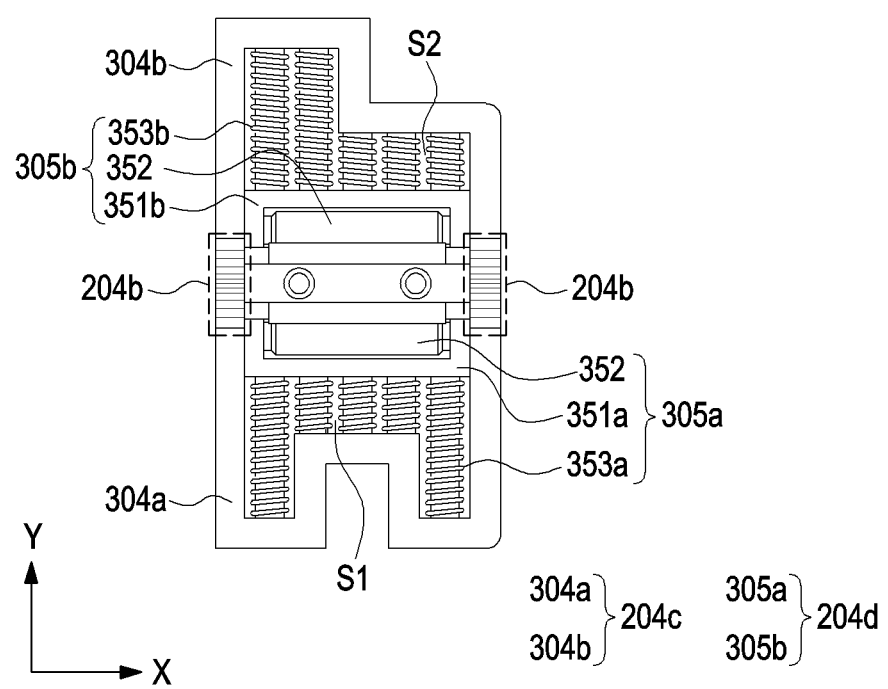

FIGS. 31 and 32 are diagrams illustrating an interlocking part 204b, a second rotation part 204c, and a detent part 204d of an electronic device (e.g., the electronic device 200 of FIGS. 3, 4 and 5) and/or a hinge module (e.g., the hinge module 204 of FIG. 6) according to various embodiments.

According to an embodiment, the hinge module 204 may include an interlocking portion 204b, a second rotation part 204c, and a detent part 204d. The structure of the hinge module 204 of FIGS. 31 and 32 may be the same or similar in whole or part as the structure of the hinge module 204 of FIGS. 5, 6, 7 and 8.

According to an embodiment, the detent hinge 308 may be mounted or fixed to a multi-bar assembly (e.g., multi-bar assembly 206 of FIG. 3), and the detent brackets 304a and 304b may be pivotably coupled to both sides of the detent hinge 308. The detent assemblies 305a and 305b may be received in the inner spaces S formed by the detent brackets 304a and 304b, pivoting as the detent brackets 304a and 304b pivot. According to an embodiment, the hinge module 204 may be mounted in the electronic device, and various design changes may be made thereto depending on the arrangement of the components of the first housing (e.g., the first housing 201 of FIG. 5) or the second housing (e.g., the second housing 202 of FIG. 5).

Referring to FIG. 32, the holders 351a and 351b, rollers 352, and elastic members 353 of the detent assemblies 305a and 305b may have a different design from the structure shown in FIG. 5. For example, the shape of the first detent bracket 304a and the shape of the first elastic members 353a located in the first housing 201 and the shape of the second detent bracket 304b and the shape of the second elastic members 353b located in the second housing 202 may be changed to differ corresponding to the mounting space of the first housing 201 or the second housing 202. In FIG. 32, the detent brackets 304a and 304b include a frame extending along the X direction and a frame extending along the Y direction, and the lengths of one side and the other side of the frame extending along the X direction are different from each other. To correspond to this, the lengths of the elastic members 353a and 353b mounted in the detent brackets 304a and 304b may be designed to differ from one another. In an embodiment, as the components disposed inside the first housing 201 and the second housing 202 are different, the shape of the first detent bracket 304a and the shape of the second detent bracket 304b may be designed to be different from each other so as to avoid the area where the components are arranged. To correspond to this, the arrangement and shape of the first elastic member 353a and the second elastic member 353b may also be changed to differ.

According to an example embodiment, an electronic device (e.g., the electronic device 200 of FIGS. 3 to 5) comprises: a first housing (e.g., the first housing 201 of FIG. 3), a second housing (e.g., the second housing 202 of FIG. 3), a hinge module (e.g., the hinge module 204 of FIG. 3) pivotably connecting the first housing and the second housing, and a flexible display (e.g., the display 203 of FIG. 3) disposed from a surface of the first housing through an area where the hinge module is disposed to a surface of the second housing. The hinge module may include a detent hinge (e.g., the detent hinge 308 of FIG. 7) at least partially receiving a pair of rotation shafts (e.g., the rotation shafts 373 of FIG. 7) and including a cam-shaped cam surface (e.g., the cam surface 383 of FIG. 7) in a direction perpendicular to a rotation axis (e.g., the rotation axis R1 or R2 of FIG. 7) of the rotation shaft, a roller (e.g., the roller 352 of FIG. 7) contacting the cam surface and configured to rotate corresponding to the cam shape, at least one elastic member (e.g., the elastic member 353 of FIG. 7) including an elastic material and disposed in the direction perpendicular to the rotation axis of the rotation shaft and configured to deliver an elastic force to the roller, and a detent bracket (e.g., the detent bracket 304a or 304b of FIG. 7) including the pair of shafts and defining a space (e.g., the space S of FIG. 7) configured to receive the roller and the at least one elastic member.

According to an example embodiment, the electronic device may further comprise a holder (e.g., the holder 351a or 351b of FIG. 7) rotatably coupled with the roller and supporting the at least one elastic member remain in place.

According to an example embodiment, the detent bracket may include a guide recess (e.g., the guide recess 374 of FIG. 11) extending along the direction perpendicular to the rotation axis of the rotation shaft. The holder may include a moving member (e.g., the moving member 3515 of FIG. 14) including a protrusion configured to slide movement along the guide recess.

According to an example embodiment, the holder may include a first portion (e.g., the first portion 3511 of FIG. 14) facing the detent hinge and a second portion (e.g., the second portion 3512 of FIG. 14) facing away from the first portion. The first portion may include arms (e.g., the arm 3513 of FIG. 14) protruding toward the detent hinge to receive the roller, and the second portion may include a plurality of protrusions (e.g., the protrusion 3514 of FIG. 14) facing away from the detent hinge to support the plurality of elastic members.

According to an example embodiment, the plurality of elastic members are arranged to correspond to a length of the roller to allow an outer surface of the roller to deliver elastic force to substantially an entire cam surface.

According to an example embodiment, the roller may include an injected material having a lower strength and/or specific gravity than a metal.

According to an example embodiment, the detent hinge may include a hinge frame (e.g., the hinge frame 381 of FIG. 11), a receiving groove (e.g., the receiving groove 382 of FIG. 11) disposed in each of two opposite ends of the hinge frame and at least partially receiving the pair of rotation shafts, and a fastening hole (e.g., the fastening hole 384 of FIG. 11) configured to couple with the electronic device.

According to an example embodiment, the detent bracket may include a bracket frame (e.g., the bracket frame 371 of FIG. 11) having an open side, a gear (e.g., the gear 372 of FIG. 11) disposed adjacent the rotation shaft on a side of an end surface of the bracket frame, and a slide pole (e.g., the slide pole 376 of FIG. 11) extending in parallel with the rotation shaft on an opposite side of the end surface of the bracket frame.

According to an example embodiment, the gear may at least partially surround an outer surface of the rotation shaft.

According to an example embodiment, the second housing may be configured to pivot between a folded position in which the second housing faces the first housing and a position in which the second housing is unfolded from the first housing at a designated angle. In the position in which the second housing is unfolded from the first housing at the designated angle, an outer surface of the roller receiving the elastic force may be configured to overlap an area of the cam surface.

According to an example embodiment, the hinge module may include a first hinge bracket (e.g., the first hinge bracket 301*a* of FIG. 7) rotatably supporting an end of the pair of rotation shafts, a pair of rotation brackets (e.g., the rotation brackets 302*a* and 302*b* of FIG. 7) pivotably mounted on the first hinge bracket, and a slide member (e.g., the slide member 329*a* or 329*b* of FIG. 7) including a protrusion mounted in any one of the first housing and the second housing and slidably coupled with the rotation bracket.

According to an example embodiment, the rotation bracket may be configured to pivot about a pivot axis located in parallel with a rotation axis of the gear shaft in a position spaced apart from the rotation axis of the rotation shaft.

According to an example embodiment, the slide member may include a first member (e.g., the first member 308*a* of FIG. 7) coupled to be slidable along a guide hole (e.g., the guide hole 321*b* of FIG. 7) of the rotation bracket, and a second member (e.g., the second member 308*b* of FIG. 7) extending from the first member and including a slide hole (e.g., the slide hole 327*b* of FIG. 7) wherein the slide pole of the detent bracket is slidable.

According to an example embodiment, as the second housing pivots about the first housing, the first member may linearly move on the rotation bracket in a first direction, and the slide pole may linearly move on the second member in a second direction opposite to the first direction.

According to an example embodiment, the hinge module further may include a second hinge bracket rotatably supporting an opposite end of the pair of rotation shaft.

According to an example embodiment, an electronic device (e.g., the electronic device 200 of FIGS. 3 to 5) comprises: a first housing (e.g., the first housing 201 of FIG. 3), a second housing (e.g., the second housing 202 of FIG. 3), a hinge module (e.g., the hinge module 204 of FIG. 3) pivotably connecting the first housing and the second housing, and a flexible display (e.g., the display 203 of FIG. 3) disposed from a surface of the first housing through an area where the hinge module is disposed to a surface of the second housing. The hinge module may include a detent hinge (e.g., the detent hinge 308 of FIG. 7) having a cam-shaped cam surface (e.g., the cam surface 383 of FIG. 7), a detent bracket (e.g., the detent bracket 304*a* or 304*b* of FIG. 7) including a pair of rotation shafts (e.g., the rotation shaft 373 of FIG. 7), and pivotally connected with the detent hinge, a roller (e.g., the roller 352 of FIG. 7) slidingly contacting the cam surface and disposed to rotate corresponding to the cam shape, at least one elastic member (e.g., the elastic member 353 of FIG. 7) disposed in the direction perpendicular to the rotation axis of the rotation shaft and configured to deliver an elastic force to the roller, a hinge bracket (e.g., the first and second hinge brackets 301*a* and 301*b* of FIG. 7) rotatably supporting an end of the pair of rotation shafts, a pair of rotation brackets (e.g., the rotation brackets 302*a* and 302*b* of FIG. 7) pivotably mounted on the hinge bracket, and a slide member (e.g., the slide member 329*a* or 329*b* of FIG. 7) including a protrusion mounted in any one of the first housing and the second housing and slidably coupled with the rotation bracket.

According to an example embodiment, the hinge module further may include a holder (e.g., the holder 351*a* or 351*b* of FIG. 7) rotatably supporting the roller and configured to slide along a guide recess formed in the detent bracket. A moving direction of a slide member constrained in the guide recess may be perpendicular to the rotation axis of the rotation shaft.

According to an example embodiment, the holder may include a first portion facing the detent hinge and a second portion facing away from the first portion. The first portion may include arms protruding toward the detent hinge to receive the roller, and the second portion may include a plurality of protrusions facing away from the detent hinge configured to support the plurality of elastic members.

According to an example embodiment, the plurality of elastic members are arranged to correspond to a length of the roller to allow an outer surface of the roller to deliver elastic force to substantially an entire cam surface.

According to an example embodiment, the second housing may be configured to pivot between a folded position in which the second housing faces the first housing and a position in which the second housing is unfolded from the first housing at a designated angle. In the position in which the second housing is unfolded from the first housing at the designated angle, an outer surface of the roller receiving the elastic force may be configured to overlap an area of the cam surface.

According to an example embodiment, an electronic device (e.g., the electronic device 200 of FIGS. 3 to 5) comprises: a first housing (e.g., the first housing 201 of FIG. 3), a second housing (e.g., the second housing 202 of FIG. 3), a hinge module (e.g., the hinge module 204 of FIG. 3) pivotably connecting the first housing and the second housing, and a foldable display (e.g., the display 203 of FIG. 3) disposed from a surface of the first housing through an area where the hinge module is disposed to a surface of the second housing. The hinge module may include a detent bracket (e.g., a detent bracket 304*a* or 304*b* of FIG. 7) including a pair of rotation shafts (e.g., the rotation shaft 373 of FIG. 7) and a guide recess (e.g., the guide recess 374 of FIG. 11), a detent hinge (e.g., the detent hinge 308 of FIG. 7) connected to interlock with the detent bracket and having a cam-shaped cam surface (e.g., the cam surface 383 of FIG. 7), a roller (e.g., the roller 352 of FIG. 7) slidingly contacting the cam surface and configured to rotate corresponding to the cam shape, a holder (e.g., the holder 351*a* or 351*b* of FIG. 7) including a slide member (e.g., the moving member 3515 of FIG. 14) including a protrusion configured to slide along the guide recess and rotatably supporting the roller, and at least one elastic member (e.g., the elastic member 353 of FIG. 7) including a material formed to provide an elastic force disposed in a direction perpendicular to the rotation axis of the rotation shaft and configured to deliver elastic force to the roller.

While the disclosure has been illustrated and described with reference to various example embodiments, it will be understood that the various example embodiments are intended to be illustrative, not limiting. It will be further understood by those skilled in the art that various changes, modifications, or alterations may be made to the various example embodiments without departing from the true spirit and full scope of the disclosure, including the appended claims and their equivalents.

The invention claimed is:

1. An electronic device, comprising:
a first housing;
a second housing;
a hinge module pivotably connecting the first housing and the second housing; and
a flexible display disposed from a surface of the first housing through an area where the hinge module is disposed to a surface of the second housing, wherein the hinge module includes:
a detent hinge at least partially receiving a pair of rotation shafts and including a cam-shaped cam surface provided in a direction perpendicular to a rotation axis of the rotation shaft;
a roller contacting the cam surface and configured to rotate corresponding to the cam shape;
at least one elastic member including an elastic material, and disposed in the direction perpendicular to the rotation axis of the rotation shaft and configured to deliver an elastic force to the roller; and
a detent bracket including the pair of shafts and defining a space for receiving the roller and the at least one elastic member.

2. The electronic device of claim 1, further comprising a holder rotatably coupled with the roller and supporting the at least one elastic member to remain in place.

3. The electronic device of claim 2, wherein the detent bracket includes a guide recess extending along the direction perpendicular to the rotation axis of the rotation shaft, and wherein the holder includes a moving member including a protrusion configured to slide movement along the guide recess.

4. The electronic device of claim 2, wherein the holder includes a first portion facing the detent hinge and a second portion facing away from the first portion, and wherein the first portion includes arms protruding toward the detent hinge to receive the roller, and the second portion includes a plurality of protrusions facing away from the detent hinge configured to support the plurality of elastic members.

5. The electronic device of claim 4, wherein the plurality of elastic members are arranged to correspond to a length of the roller to allow an outer surface of the roller to deliver elastic force to substantially an entire cam surface.

6. The electronic device of claim 1, wherein the roller includes an injected material having a lower strength and/or specific gravity than a metal.

7. The electronic device of claim 1, wherein the detent hinge includes:
a hinge frame;
a receiving groove disposed in each of two opposite ends of the hinge frame and at least partially receiving the pair of rotation shafts; and
a fastening hole configured to couple with the electronic device.

8. The electronic device of claim 1, wherein the detent bracket includes:
a bracket frame having an open side;
a gear disposed adjacent the rotation shaft on a side of an end surface of the bracket frame; and
a slide pole extending in parallel with the rotation shaft on an opposite side of the end surface of the bracket frame.

9. The electronic device of claim 8, wherein the gear at least partially surrounds an outer surface of the rotation shaft.

10. The electronic device of claim 1, wherein the second housing is configured to pivot between a folded position in which the second housing faces the first housing and a position in which the second housing is unfolded from the first housing at a designated angle, and wherein in the position in which the second housing is unfolded from the first housing at the designated angle, an outer surface of the roller receiving the elastic force is configured to overlap an area of the cam surface.

11. The electronic device of claim 1, wherein the hinge module includes:
a first hinge bracket rotatably supporting an end of the pair of rotation shafts;
a pair of rotation brackets pivotably mounted on the first hinge bracket; and
a slide member including a protrusion mounted in any one of the first housing and the second housing and slidably coupled with the rotation bracket.

12. The electronic device of claim 11, wherein the rotation bracket is configured to pivot about a pivot axis located in parallel with a rotation axis of the gear shaft in a position spaced apart from the rotation axis of the rotation shaft.

13. The electronic device of claim 11, wherein the slide member includes:
a first member coupled to be slidable along a guide hole of the rotation bracket; and
a second member extending from the first member and including a slide hole where the slide pole of the detent bracket is slidable.

14. The electronic device of claim 12, wherein as the second housing is configured to pivot about the first housing, the first member is configured to linearly move on the rotation bracket in a first direction, and the slide pole is configured to linearly move on the second member in a second direction opposite to the first direction.

15. The electronic device of claim 11, wherein the hinge module further includes a second hinge bracket rotatably supporting an opposite end of the pair of rotation shafts.

* * * * *